(12) United States Patent
Mathews et al.

(10) Patent No.: US 7,149,625 B2
(45) Date of Patent: Dec. 12, 2006

(54) METHOD AND SYSTEM FOR DISTRIBUTED NAVIGATION AND AUTOMATED GUIDANCE

(76) Inventors: Michael B. Mathews, 10725 - 126th Pl. NE., Kirkland, WA (US) 98033; Poul T. Lomholt, PMB 256 - 2373 NW. 185th, Hillsboro, OR (US) 97124; William A. Littlewood, 438 Massachusetts Ave., Apt. 416, Arlington, MA (US) 02474

( * ) Notice: Subject to any disclaimer, the term of this patent is extended or adjusted under 35 U.S.C. 154(b) by 379 days.

(21) Appl. No.: 10/158,223

(22) Filed: May 29, 2002

(65) Prior Publication Data
US 2003/0060973 A1 Mar. 27, 2003

Related U.S. Application Data

(60) Provisional application No. 60/295,084, filed on May 31, 2001.

(51) Int. Cl.
*G01C 21/30* (2006.01)
*G01C 21/32* (2006.01)

(52) U.S. Cl. ............... 701/209; 701/200; 701/201; 701/213; 340/995

(58) Field of Classification Search ........... 701/209, 701/200, 201, 205, 96; 73/178.12; 340/991, 340/993, 995.18, 995.2, 995.24
See application file for complete search history.

(56) References Cited

U.S. PATENT DOCUMENTS

| | | | | |
|---|---|---|---|---|
| 5,331,561 A | * | 7/1994 | Barrett et al. ............... | 701/205 |
| 5,504,482 A | * | 4/1996 | Schreder ............... | 340/995.13 |
| 5,625,556 A | * | 4/1997 | Janky et al. .................... | 701/1 |
| 5,802,492 A | * | 9/1998 | DeLorme et al. ........ | 455/456.5 |
| 5,810,392 A | * | 9/1998 | Gagnon ....................... | 180/268 |
| 5,865,463 A | * | 2/1999 | Gagnon et al. ........... | 280/730.2 |
| 5,948,040 A | * | 9/1999 | DeLorme et al. ............ | 701/201 |
| 5,951,620 A | * | 9/1999 | Ahrens et al. ............... | 701/200 |
| 5,955,973 A | * | 9/1999 | Anderson .................... | 340/988 |
| 5,971,432 A | * | 10/1999 | Gagnon et al. .............. | 180/268 |
| 5,987,381 A | * | 11/1999 | Oshizawa .................... | 701/209 |
| 5,991,676 A | * | 11/1999 | Podoloff et al. ............. | 177/144 |
| 6,009,403 A | * | 12/1999 | Sato .............................. | 705/6 |
| 6,070,124 A | * | 5/2000 | Nimura et al. ............... | 701/211 |
| 6,075,467 A | * | 6/2000 | Ninagawa .............. | 340/995.14 |
| 6,076,041 A | * | 6/2000 | Watanabe .................... | 701/211 |
| 6,104,338 A | * | 8/2000 | Krasner .................. | 342/357.06 |
| 6,158,768 A | * | 12/2000 | Steffens et al. .............. | 180/237 |
| 6,169,515 B1 | * | 1/2001 | Mannings et al. ........ | 342/357.1 |
| 6,216,086 B1 | * | 4/2001 | Seymour et al. ............ | 701/202 |

(Continued)

*Primary Examiner*—Cuong Nguyen
(74) *Attorney, Agent, or Firm*—Christensen O'Connor Johnson Kindness PLLC

(57) ABSTRACT

The present invention provides for distributed navigation and route guidance using networked computing devices. A computing device may host one or more navigation functional components. The location of a navigable object is sensed and communicated to associated navigation components in a communication network. The navigation components collectively provide guidance information to a navigable object controller. A navigable object controller directs the movement of an navigable object using guidance information to keep it on a specified route. The navigable object controller interacts with the distributed navigation system through an interface, which provides the appropriate presentation of guidance information and functions for the particular type of navigable object controller (e.g., human-machine interface, or system to system). The present invention provides the structures and methods for a flexible navigation and guidance system supporting a variety of network capabilities and computing devices using the same software implementation.

51 Claims, 16 Drawing Sheets

U.S. PATENT DOCUMENTS

| | | |
|---|---|---|
| 6,249,742 B1 | 6/2001 | Friederich et al. |
| 6,292,745 B1 | 9/2001 | Robare et al. |
| 6,317,684 B1 | 11/2001 | Roeseler et al. |
| 6,345,839 B1 * | 2/2002 | Kuboki et al. ............... 280/735 |
| 6,359,571 B1 | 3/2002 | Endo et al. |
| 6,370,539 B1 | 4/2002 | Ashby et al. |
| 6,401,034 B1 * | 6/2002 | Kaplan et al. ............... 701/209 |
| 6,553,130 B1 * | 4/2003 | Lemelson et al. ........... 382/104 |
| 6,553,308 B1 * | 4/2003 | Uhlmann et al. ............ 701/208 |
| 6,577,937 B1 * | 6/2003 | Shuman et al. ................ 701/48 |
| 6,597,983 B1 * | 7/2003 | Hancock ...................... 701/200 |
| 6,628,233 B1 * | 9/2003 | Knockeart et al. ........ 342/357.1 |
| 2002/0120374 A1 * | 8/2002 | Douros et al. ................. 701/29 |
| 2002/0173907 A1 * | 11/2002 | Ando ......................... 701/209 |
| 2003/0043019 A1 * | 3/2003 | Tanaka et al. .............. 340/5.64 |
| 2003/0151501 A1 * | 8/2003 | Teckchandani et al. ..................... 340/426.19 |

* cited by examiner

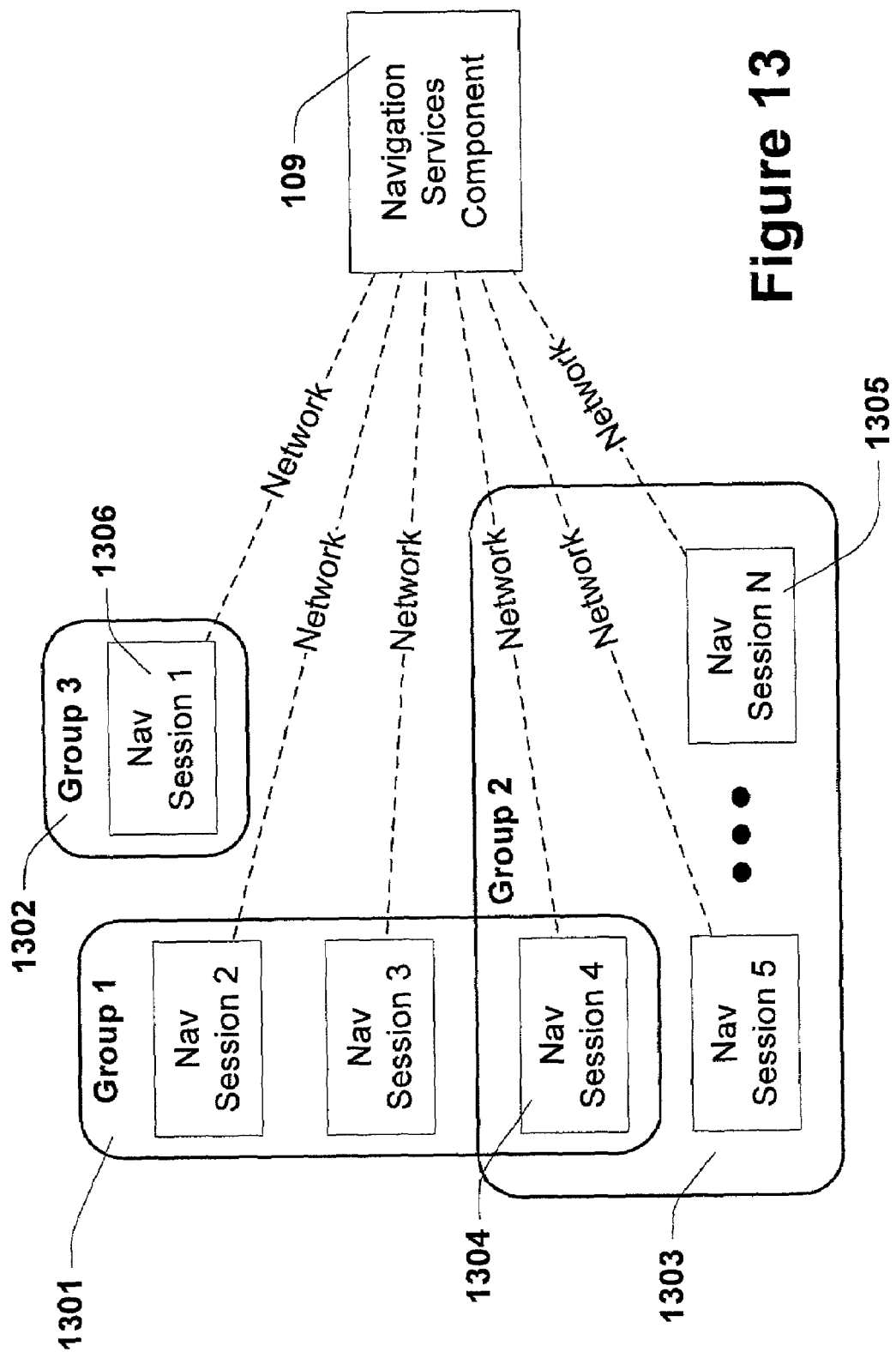

METHOD AND SYSTEM FOR DISTRIBUTED NAVIGATION AND AUTOMATED GUIDANCE

CROSS-REFERENCE TO RELATED APPLICATION

This application claims the benefit of U.S. Provisional Application No. 60/295,084, filed date May 31, 2001.

FIELD OF THE INVENTION

The invention generally relates to a system and method for providing navigation and automated guidance to a mobile user, and more particularly to a system and method of loosely coupled modules cooperatively providing navigation and automated guidance to a mobile user.

BACKGROUND OF THE INVENTION

Navigation systems have been developed to provide route and geographical information for directing a mobile user to one or more destinations. These systems are typically being delivered in two primary forms: a self-contained autonomous configuration, and a mobile client and fixed server configuration using some wireless communications means.

An autonomous navigation system provides a single unit comprising a map database, location sensor, user interface, and guidance functions. These types of systems provide everything that is needed to provide navigation and automated guidance in one package without any external data or support. This configuration benefits in terms of robustness in that, being autonomous, it can operate almost anywhere for which it has map data. Recent advances have augmented these types of systems with real-time information, such as traffic, events, and road construction information using wireless data communications. These systems have begun to proliferate in Europe, Japan, and in the U.S., but have been slow to become standard equipment due to the expense of each system, most costing $1500 or more.

While these systems provide a high-quality navigation experience, they are limited by their relative high cost, and by the currency of their information. The primary drawback of autonomous navigation systems is the need to have all map and geographic information integrated as part of the system. This information is typically stored on a CD-ROM or DVD depending upon the detail and geographic region covered, and must be updated periodically to stay current with changes in the road network as well as to provide new points of interests. By storing the information in the navigation system, the cost of the system is higher due to the extra physical equipment and processing requirements. Additionally, the data has a tendency to go out of date. These systems also tend to be bulky and not well suited for non-vehicular navigation and guidance, such as pedestrian navigation.

In response to the limitations of autonomous navigation, another type of navigation system was developed, termed 'off-board' navigation, in which a server houses the map and route calculation functions, such that client devices using wireless communications can access the latest map and other navigation-related information without needing to store large amounts of data locally. By locating the information centrally, the data is much more easily maintained and integrated with other dynamic data, such as traffic and road construction information, when compared to autonomous systems. Using this 'off-board' configuration, low-cost devices such as portable/laptop computers and PDAs (personal digital assistants) can be used to provide navigation information so long as they have a location sensor (e.g., GPS) and a wireless connection. These types of systems provide the same general functionality as an autonomous system but delegate the processor-intensive route calculation and map functions to the server, which can provide these functions for multiple devices concurrently. Off-board navigation creates low-cost, highly portable navigation and guidance solutions.

A typical navigation scenario using off-board navigation comprises the following steps. Using a client device, a user specifies selection criteria for a route, including one or more destinations, the type of route (e.g., fastest, shortest, scenic), and other personal preferences. A client device transmits the route request to the navigation server, which calculates the route between the client device's current location and the specified destinations. Additionally, other interactions between the system and user may be required to resolve any information not understood by the server, such as an improper address entry or a point-of-interest selection. Following a successful route calculation, the information is delivered to the client device, which either displays the resulting navigation information to the user or processes the information by a local guidance function on the client device.

Though 'off-board' navigation systems represent a significant step over autonomous navigation systems, they tend to be very limited in their usefulness as they operate only in areas with wireless communications. Implementations of these systems have resulted in highly proprietary data and communications protocols in order to move information efficiently between the client device and server. As a result, these systems are fairly inflexible and support only a limited number of configurations, devices, and features. In addition, these systems are unable to degrade gracefully when communications break down, as they rely heavily upon the server for continuous navigation information.

A problem with both types of navigation systems is their tendency to be limited to a single user or a single navigation activity. Both lack the ability to incorporate other navigation activities, such as tracking information or guidance information, where other individuals or systems may coordinate navigation together to achieve a common result.

Though both types of navigation systems provide useful guidance and navigation functions, they are limited by platform requirements and propriety implementations. There is a need to blend and balance the two approaches to form a distributed solution that can operate in both configurations as well as others, thereby gaining their respective advantages. With the proliferation of the Internet and associated wireless Internet, a more distributed and platform-independent approach is needed wherein the navigation system's core functions are defined and implemented such that the communications and platform requirements are encapsulated and isolated. This will allow the system to be defined and operated in a logical configuration without explicit knowledge of the physical configuration. There is a further need for the system to adapt, and to support intermittent communications, where one or more parts of the navigation system may be unable to communicate with the other parts, yet still provide their designated function. In addition, the system should be robust and degrade gracefully in the event of unexpected problems.

A useful advance over current systems that is needed would be a navigation system that is dynamically configurable and deployable across various types of devices using standard networking technologies. Both the software implementation and data formats should be defined using open standards such as JAVA, C++, and XML, such that they provide maximal platform independence and integration flexibility. The navigation system would also support multiple device configurations where the navigation system functions are deployed on three or more devices.

Another useful advance would be to provide navigation functionality where multiple parties coordinate navigation activities. Navigation information for one user would be shared and integrated in navigation information for other parties, and provide enabling scenarios such as 'follow-the-leader', fleet dispatch, and tracking. There is a need to provide relative guidance, where one vehicle or navigable object is guided with respect to another navigable object.

Yet another useful advance over prior art would be a navigation system that is easy to extend and integrate with other systems without requiring significant engineering and development. A method and system for distributed navigation and automated guidance that solves the preceding problems and addresses the specified needs would be a useful and novel advance over the prior art.

SUMMARY OF THE INVENTION

The present invention provides a method and system for distributed navigation and automated route guidance using a plurality of networked computing devices. A navigation and guidance system comprising well-formed components are integrated using standardized distributed networking protocols, wherein the physical connection and integration are managed by a plurality of host computing platforms and a communication network. In particular, the present invention defines a navigation session, in which a plurality of navigation components operate to provide navigation and guidance information for a navigable object. The session serves to provide a common context between components. All navigation and guidance activities are conducted within the scope of a session, in which each navigation component provides a specific function, and interacts with other components in a peer-to-peer manner. The primary components of the presently preferred form of the distributed navigation system include a navigation guidance interface, a physical location sensor, a guidance component, a navigation management component, a caching component, and a navigation services component. Depending on a particular configuration, selected ones of these components are deployed on various computing platforms, creating a distributed navigation system on the required functions and performance.

One aspect of the present invention provides a method comprising obtaining navigation and guidance information in which the navigation state is shared jointly by the navigation system components. A route definition, comprising one or more destinations, describes certain destinations using symbolic names such as "current location", "current direction", and symbolic places such as "home" and "office". The method defines the process for calculating and deploying routes and other navigation information, in which each navigation component is updated according to the configuration managed by the navigation session. The method attempts to minimize network transactions by taking advantage of cached information when available.

Another aspect of the present invention provides a method for distributed automated guidance, wherein the guidance component can be configured to operate locally or remotely with respect to the navigation interface component. Depending upon the network configuration, the guidance component may be deployed locally with respect to the physical location sensor and navigation guidance interface, wherein the components can interact with little or no latency or delay of feedback. In another configuration, the guidance component may operate remotely from the navigation guidance interface and physical location sensor, wherein the navigation guidance interface is required to operate independently of the guidance component using predicted events and state information. In the remote configuration, the guidance component is periodically updated such that predicted events can be updated with respect to the current navigation state. The predicted events and state information are formatted in a manner that reduces navigation guidance interface processing, where simple trigger conditions, such as time or place, are used to execute the predicted events.

In yet another aspect of the present invention, a method is provided for coordinating navigation state information between a plurality of sessions, wherein a first navigation session shares navigation state information with other navigation sessions within the same group. The coordination of session information provides a useful means for providing navigation and guidance information relative to a dynamic object, such as another vehicle. Further, sharing navigation state information provides a means to track and coordinate common data between a plurality of related navigation sessions. As will be better understood from the following discussion of a preferred embodiment, the present invention provides a flexible configuration and communication abilities using the same software adaptable to a wide variety of operating environments.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 13 is a block diagram showing the relationship between navigation sessions and the navigation services component.

DETAILED DESCRIPTION OF THE PREFERRED EMBODIMENT

The present invention provides distributed navigation and automated route guidance using a plurality of networked computing devices, in which a computing device may host one or more navigation functional components. The physical location of a navigable physical object (NPO) is sensed and communicated to one or more associated navigation components using a data network, wherein the navigation components perform their designated function for the purposes of providing guidance information to an NPO controller. An NPO controller directs the movement of an NPO and uses guidance information to keep the NPO on a specified route. Types of NPO controllers include human or electronic devices capable of interpreting guidance information. The NPO controller interacts with the distributed navigation system through a navigation guidance interface, which provides the appropriate presentation of guidance information and functions for the particular type of NPO controller (e.g., human-machine interface, or system to system). In particular, the present invention provides the structures and methods for a flexible navigation and guidance system supporting a variety of network capabilities and computing devices using the same software implementation.

Operational Configuration

In the present invention, the functional components of a navigation and automated guidance system are integrated using network protocols such that the physical software deployment need not be explicitly defined. Users of the system work with the navigation components in the context of a session such that each navigation component can manage a particular aspect of the 'navigation state' with respect to a particular session. The navigation functional components communicate with each other in a peer-to-peer fashion in accordance with the session configuration information. Using this approach, the system configuration can be altered as needed to support different types of computing devices and networking capabilities, optimizing the deployment of navigation functions.

Figure 1:
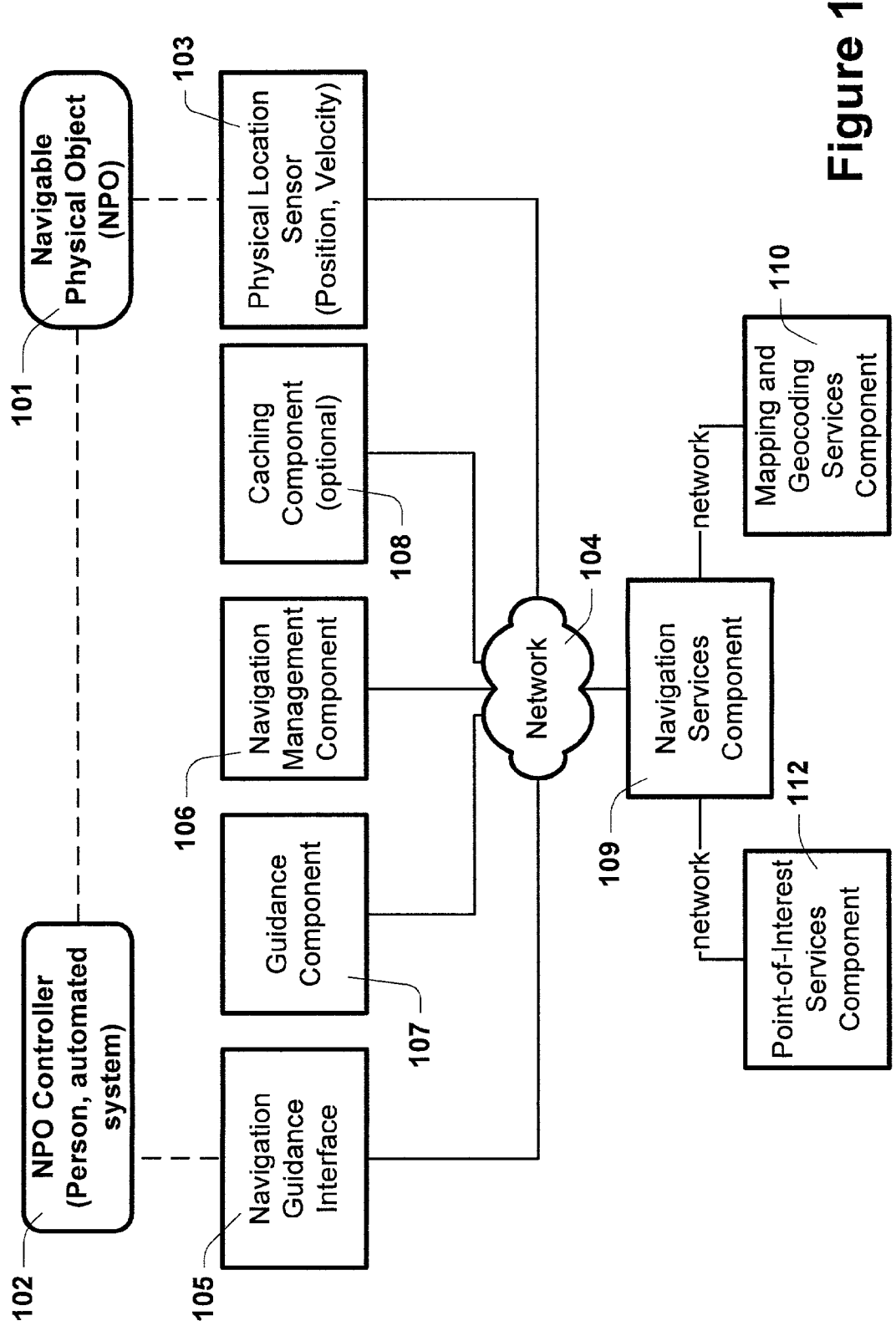
FIG. 1 is a functional block diagram illustrating the generalized logical configuration of a distributed navigation and guidance system, in which the primary components are connected through a communication network.

FIG. 1 shows the logical configuration of the navigation functional components. The NPO's 101 physical location is sensed by a physical location sensor 103, which periodically communicates physical location information to other navigation components via a computer network 104. The physical location sensor 103, such as a device coupled to a GPS, determines the position, speed, heading, and data measurement quality at some designated time. The physical location information may also include other information useful for monitoring various characteristics of the NPO, including sensor status and NPO information. These characteristic data include GPS constellation status and measurement quality, vehicle gas mileage, vehicle fuel level, network connectivity, and network performance data. The computer network 104 comprises a standardized means for computing devices to communicate information to other computing devices without regard for the physical transport details. In the preferred embodiment of the present invention the computer network 104 is a TCP/IP based network, with each device having a logical IP address that uniquely identifies the computing device. The navigation functional components 103, 105, 106, 107, 108, and 109 communicate with each other using an application protocol that defines the connection method and message formats used. One embodiment of the navigation application protocol uses SOAP (Simple Open Access Protocol) and XML (eXtensible Markup Language), wherein information is communicated between navigation functional components using well known Internet integration standards. Using SOAP and XML documents provides complete platform independence. Other application protocols include RPC, CORBA, and JAVA RMI. The computer network 104 may be comprised of one or more physical networks including local area networks (LAN) such as an Ethernet, wide area networks (WANs) such as the Internet, and wireless data networks such as CDPD, GSM ISDN, and GPRS. In the preferred embodiment of the present invention, the navigation components are defined such that network integration issues are encapsulated and independent of the functional behavior. Also in the preferred embodiment, functions can interact without explicit knowledge of the network or devices on which the functions are hosted. Many common programming environments provide this type of distributed computing capability such as JAVA, CORBA, and Microsoft COM+, where software components are defined using well defined interfaces, and details of network communication are managed by the platform through various means. With these distributed software technologies, the present invention benefits from a simplified implementation without the loss of generality or platform independence.

The NPO 101, as shown in FIG. 1, is controlled by an NPO controller 102, which interacts with the distributed navigation system through a navigation guidance interface 105, which provides the access functions for working with the various navigation and guidance features. The navigation guidance interface 105 may incorporate the necessary elements to support one or more NPO controller types. The navigation management component 106 provides the means to manage and encapsulate common navigation functions independent of the navigation guidance interface 105, including configuration and session management, event notification, and commonly used utilities. The guidance component 107 provides automated guidance features, wherein one or more navigation components receive guidance events regarding an NPO. The guidance component 107 generates guidance status information in response to changes in the information provide by the physical location sensor 103. Guidance status information can be generated in two modes: real-time or predicted events. The selected mode of automated guidance depends on the particular session configuration. A caching component 108 may be included in some navigation system configuration, where data originating from a navigation services component 109 may be cached by the caching component 108 in order to improve system performance in situations of low network data rates and low reliability. The caching component 108 enables components 105, 107, 106, and 103 to operate independently of the navigation services component 109 for a certain period. The navigation services component 109 provides navigation information, NPO tracking functions, and integration of other data and services commonly associated with navigation and guidance. The navigation services component 109 encapsulates the means to access and use navigation information as needed by the other navigation components 103, 105, 106, 107, and 108. In the preferred embodiment of the present invention, one instance of the navigation services component 109 is shared by multiple sessions and instances of the other navigation components.

By defining the navigation system this way, and requiring that the navigation functional components communicate with each other using a distributed networking technology, the present invention provides the means to support various physical network and computing device configurations using the same software. Of particular interest are two illustrative configurations: one providing a local guidance function and one providing a remote guidance function in WAN environments with potentially high latency and intermittent connectivity. Supporting these two types of configurations using the same software is a key advantage of the present invention; however, other types of configurations are also possible and anticipated though not explicitly defined.

Local Guidance Configuration

Figure 2:
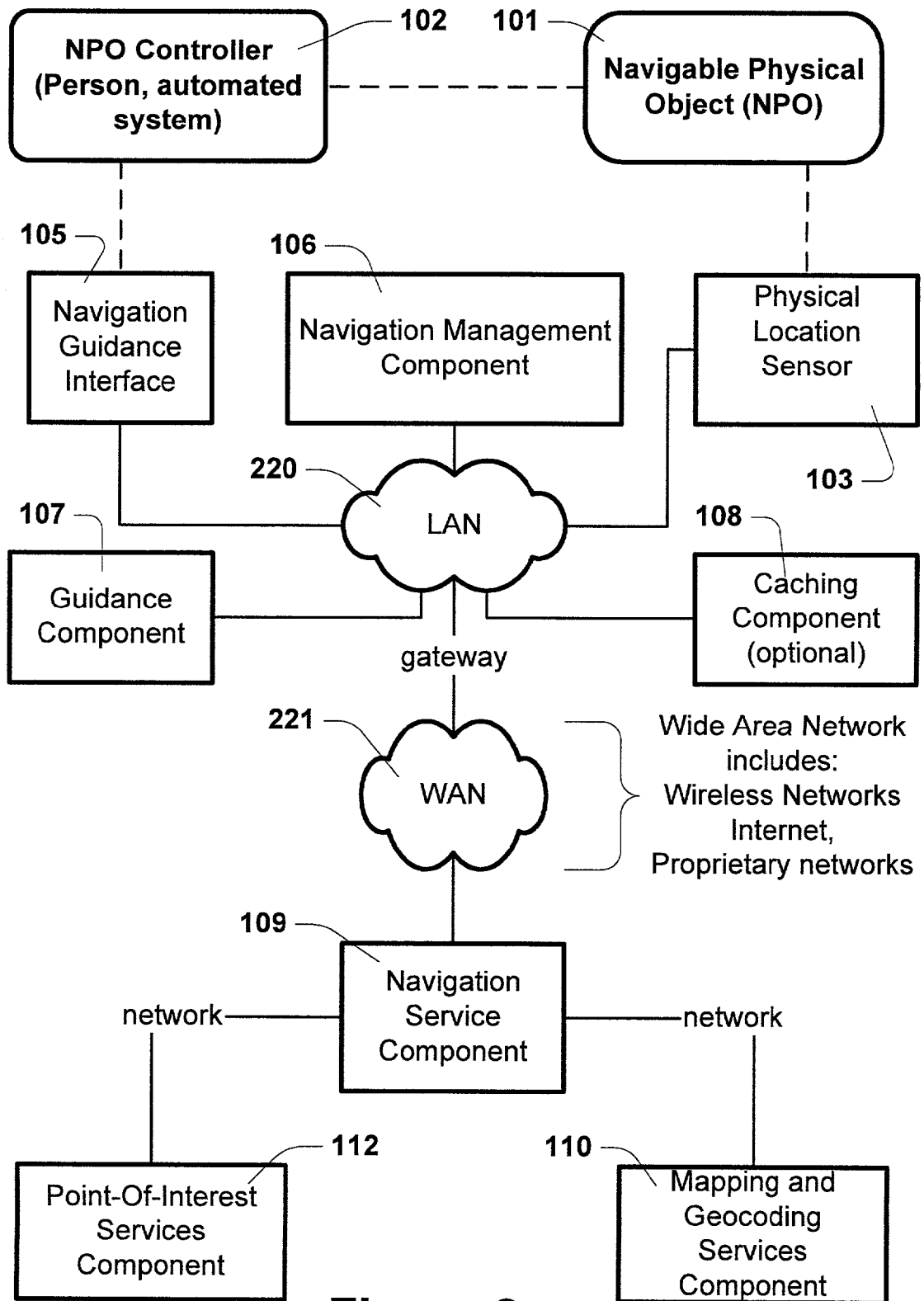
FIG. 2 is a functional block diagram illustrating in more detail one possible logical network configuration of the functional components defined FIG. 1. The diagram shows the navigation system components connected using one local area network (LAN) in conjunction with a wide area network (WAN).

FIG. 2 shows a logical distributed navigation system configuration using a LAN 220 and a WAN 221. This configuration further defines the structure of the communication network 104 shown in FIG. 1, where a LAN 220 provides high-speed, low-latency communications between components 103, 105, 106, 107, and 108, and a WAN 221, which provides network communications between the navigation services component 109 and the LAN 220. The WAN 221 typically has lower bandwidth with higher latency, and possible intermittent connectivity. The navigation system components 103, 105, 106, 107, and 108 are hosted in close proximity to the NPO 101 and NPO controller 102 such that the system can continue to function even when disconnected from the WAN 220. The WAN 220 is used only to communicate with the navigation services component 109 as needed. In this configuration, the caching component 108 is useful to help minimize communications with the navigation services component 109. In the caching component 108, often-used information can be cached locally and be easily accessible using the LAN. The guidance component 107, physical location sensor 103, and navigation guidance interface 105 operate in tight coordination, providing immediate feedback for the NPO controller on the NPO location with respect to the navigated route.

Caching Guidance Information and Other Data

For configurations where the availability of the network is intermittent, data generated by the distributed navigation system can be cached so that it is available even when a connection to the navigation guidance interface 105 is unavailable. FIG. 2 shows an embodiment of a distributed navigation system where the caching component 108 is configured as part of the distributed navigation system. There are two types of caching scenarios: passive and active.

To support caching in the proposed navigation architecture, all components must be aware of whether there is, or is not, a caching component 108 in the distributed navigation system. This is decided by the navigation management component 106 and must be communicated to each subsystem when a navigation session is created. When the caching component 108 is participating in the navigation session, all data requests must first be made to the caching component 108. Thereafter, if the caching component 108 cannot satisfy a request then the caching component 108 will respond with a cache miss response, and the requesting component will then make the request directly to another component. According to an alternate embodiment, the caching component 108 makes the request to another component instead of generating a cache miss response.

In passive caching, the caching component 108 listens for data transfers that are initiated by other components in the system. The data cached may be Maps, Routes, Points Of Interest (POI), and other types of data provided by the navigation services component 109. Future requests to caching component 108 will result in a cache hit when this data is available in cache. This will decrease latency for requests, and also reduce bandwidth over the WAN 221, which is typically slower and more expensive that LAN 220 data transfers.

In active caching, or predictive navigation, the caching component 108 actively attempts to predict which data will be needed in the future, and will initiate data requests from the other components before the data is actually needed. The algorithms used for predicting which data will be needed can use information from various data sources to improve the probability that there will be a cache hit, while best utilizing limited WAN bandwidth and local data storage capabilities. Information that is useful to the prediction algorithms includes: current location, predicted location given speed and heading, predicted location according to a predetermined route, personal preferences of the NPO Controller 102, and historical information from past requests.

Figure 3:
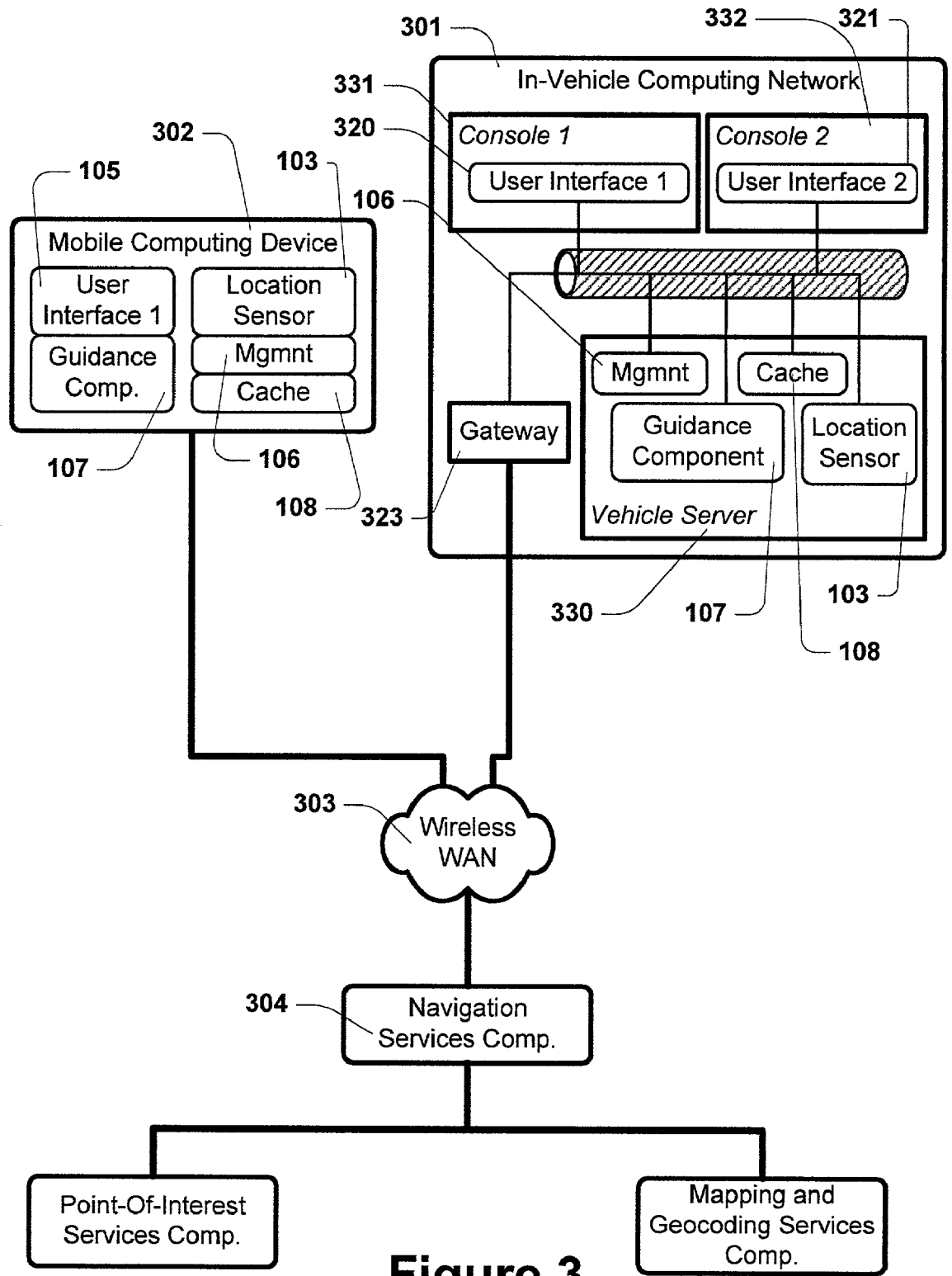
FIG. 3 is a deployment diagram showing an illustrative example of two possible physical configurations using the logical functional model described in FIG. 2.

Turning now to FIG. 3, this configuration is representative of many telematics systems, where an in-vehicle computing network comprises the navigation system components 103, 106, 107, and 108. As shown, the navigation components communicate with each other using the local network, where the functions are deployed on multiple computing and interface devices 330, 331, and 332. In this configuration, two separate user consoles are in use with two separate user interfaces 320 and 321, which are instances of the navigation guidance interface 105 in FIG. 2. The other navigation components are hosted by the vehicle server 330, which provides the processing and storage functions. The local network is connected to the WAN 303 via a gateway 323, which manages the connectivity issues. The navigation/tracking server 304 hosts the navigation services component (not shown).

A single computing device 302 hosting navigation system components 103, 105, 106, 107, 108 is another form of the LAN/WAN configuration, where the distributed networking technology used to implement the navigation function components provides for hosting on the same machine. From the navigation system components perspective this is the same as if they were deployed on different devices communicating using a LAN. This configuration is useful for handheld or portable devices, such as PDAs equipped with a wireless modem and a GPS, or in-dash telematics systems.

With local guidance configuration the distributed navigation system can approximate the autonomy of an 'on-board' navigation system, where it requires little or no communication with the navigation information server once the cache is loaded with the required information.

Remote Guidance Configuration

For system configurations where a more 'lightweight' approach is required, the distributed navigation system components can be reconfigured to support a remote guidance function, where a navigation guidance interface is not required to be connected using a low-latency, high-speed network. This configuration is useful for providing navigation and guidance functions to devices that don't have a lot of processor power or memory, where their main function is to provide a user interface. These types of devices include cell phones and wireless devices with script-capable browsers.

Figure 4:
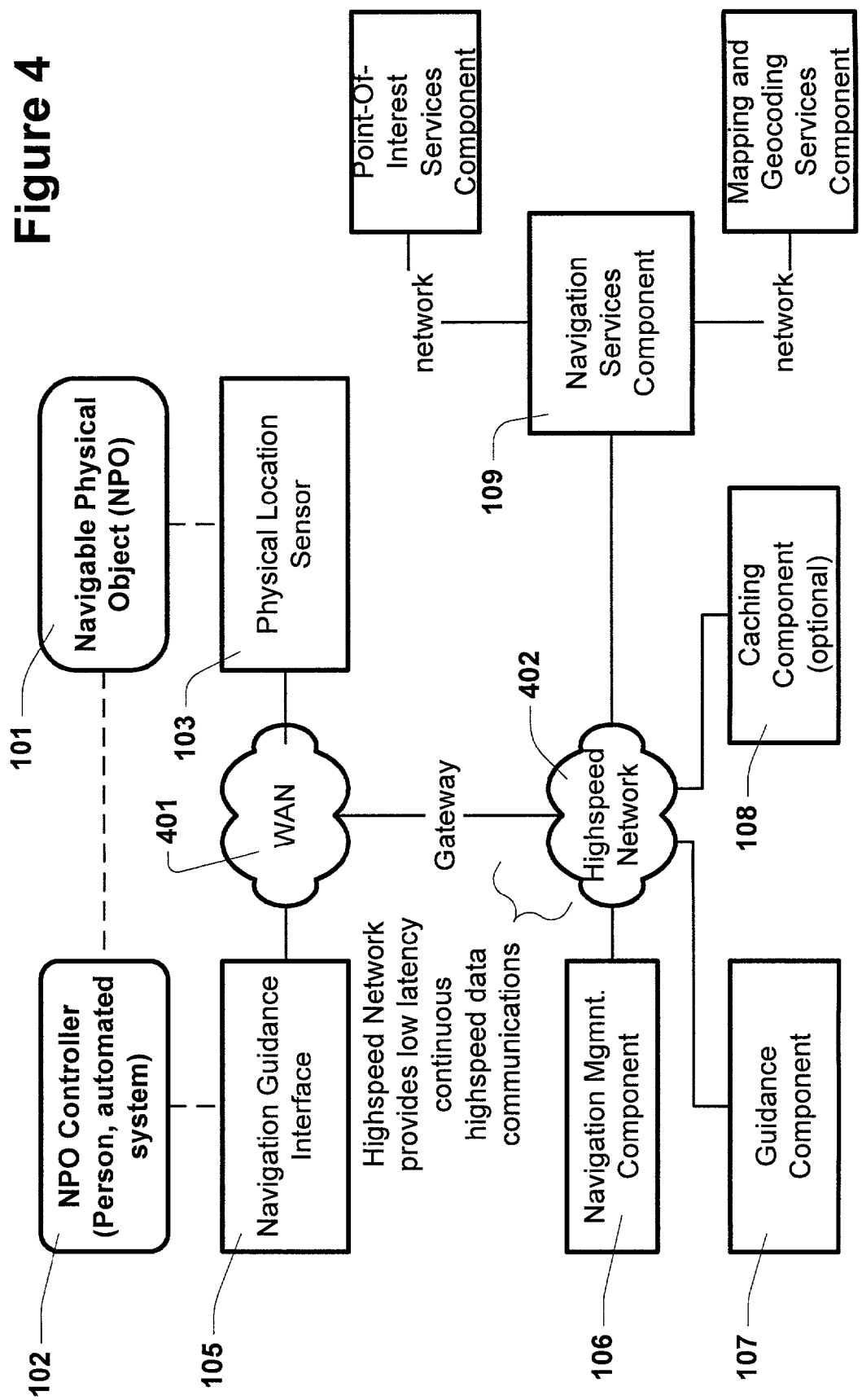
FIG. 4 is a functional block diagram illustrating in more detail one possible logical network configuration of the functional components defined in FIG. 1. The diagram shows the distributed navigation system components connected using a WAN and a high-speed network, wherein the guidance component is remotely located with respect to the navigation interface component and physical location sensor.

FIG. 4 shows one logical configuration for remote guidance, where a WAN 401 connects to a high-speed network providing communication between the navigation guidance interface 105 and the guidance component 107. The network 402 provides the communication means between the navigation system components 106, 107, 108, and 109. In this configuration the navigation guidance interface 105 must function independently of the guidance component 107 as the WAN connection may be intermittent or suffer from high latency, which in turn may cause disruption for several minutes or longer. For certain cases, connectivity with the network may require a dial-up connection as with circuit-switched wireless data systems such as GSM ISDN service. To provide automated guidance for an NPO controller 102, the guidance component prepares guidance information for current and predicted future events, based on the NPO's 101 current and anticipated trajectory. This information is packaged in a simple format that can be easily managed by the navigation guidance interface 105. As will be discussed below, predicted guidance events are defined with simple trigger conditions minimizing guidance processing within the interface. The guidance component 107 periodically updates the guidance status and delivers it to the navigation guidance interface 105 as connectivity allows. The present inventions provides for automated guidance for thin-client platforms without requiring a local implementation of the guidance function.

A difference between this configuration and the local guidance configuration is that guidance status is delivered prior to its use in a manner that allows for potentially high latency and loss of connectivity between the navigation guidance interface 105 and guidance component 107. With predicted information, there is an assumption that the NPO does not significantly deviate from the anticipated trajectory, and that the predicted information can be meaningfully applied between updates from the guidance component 107.

Figure 5:
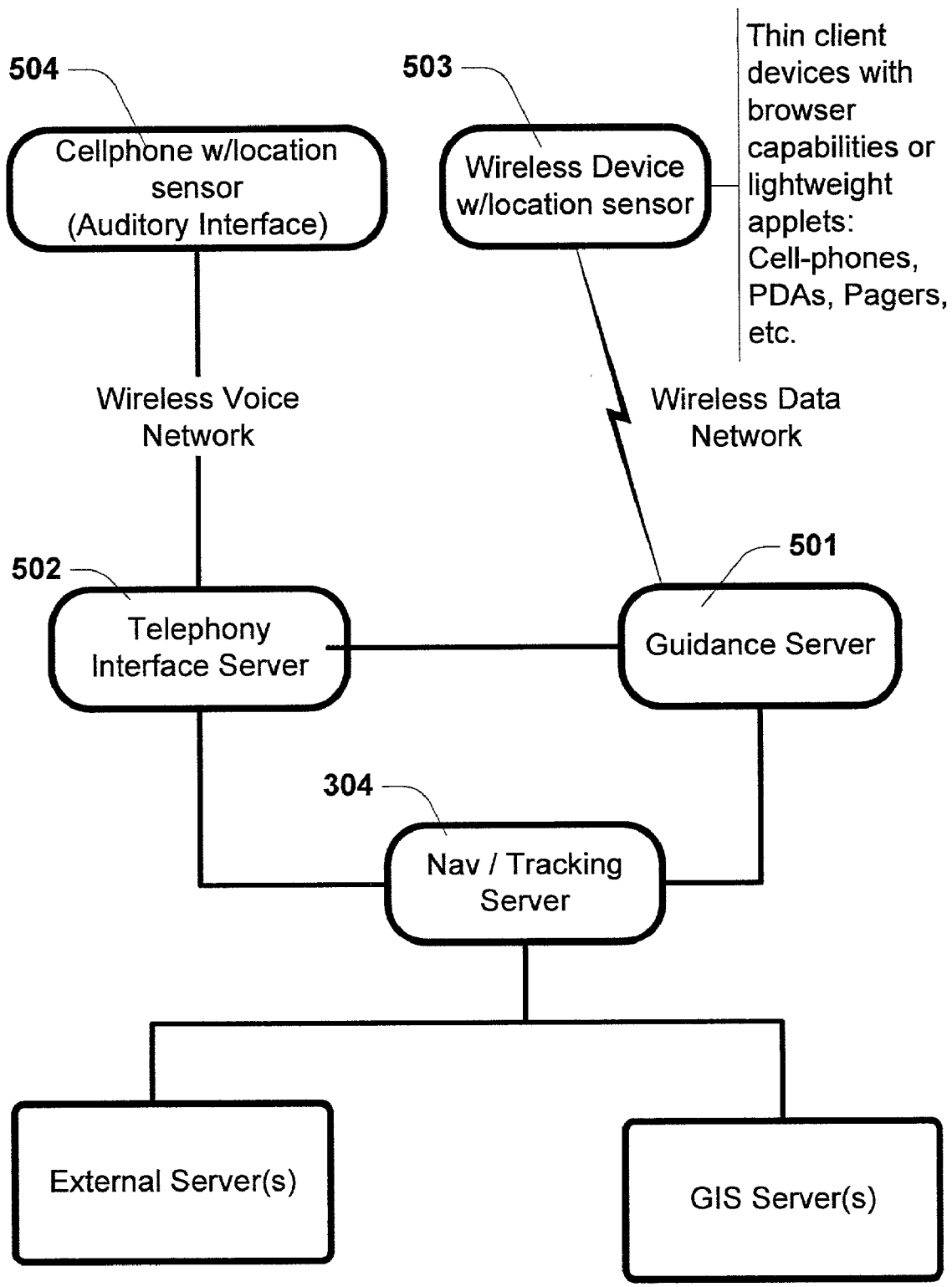
FIG. 5 is a deployment diagram showing an illustrative example of two possible physical configurations using the logical functional model described in FIG. 4.

FIG. 5 illustrates two common examples suitable for the remote guidance configuration. A guidance server 501 provides the guidance component 107 of FIG. 4, and a telephony interface server 502 provides an auditory interface for a cell phone 504 equipped with a location sensor. The telephony interface server 502 receives periodic updates of the cell phone location and transmits them to the guidance server 501, where it updates guidance status for current and anticipated events. The telephony interface server 502 translates guidance status into auditory information and transmits it to the cell phone 504. Additionally, the guidance server 501 provides guidance information to a lightweight wireless device 503, where the device has the ability to process the guidance status into a form suitable for the NPO controller. The wireless device 503 periodically transmits its current location to the guidance server 501, where the current and anticipated guidance states are updated and sent back to the wireless device 503.

Distributed Route Selection and Calculation

As to navigation functions distributed across multiple devices, the method for defining and calculating a route is different from the methods used in client/server-based off-board navigation systems. With a peer-to-peer implementation, the information required to define and calculate the route may exist with different navigation components as the navigation session state is shared. The present invention provides a method that attempts to minimize network communication between the navigation functions, if possible, while still maintaining a distributed session state.

Figure 6:
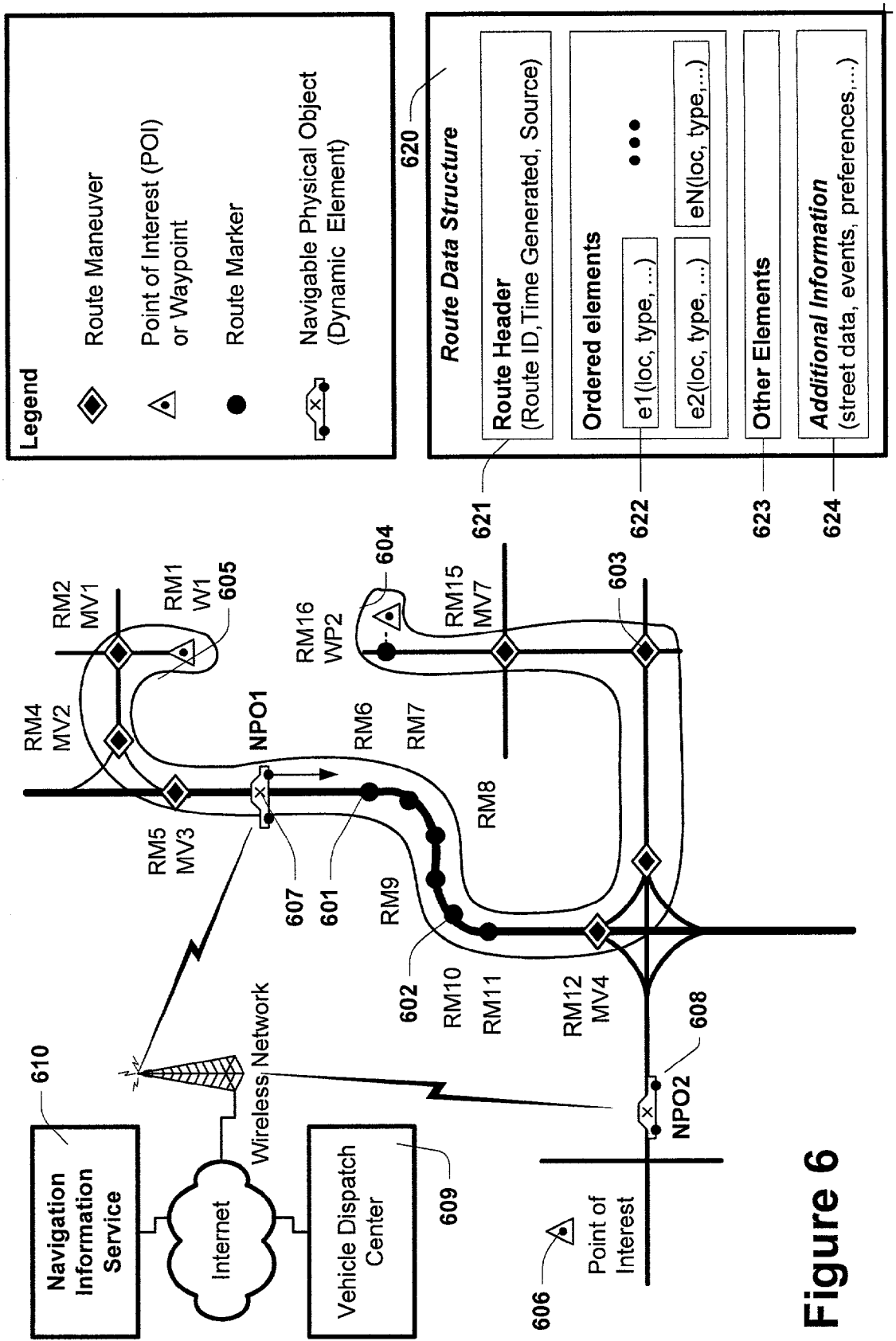
FIG. 6 is a structural diagram illustrating the various types of information and structures used in a route definition.

FIG. 6 illustrates the types of information comprising a route. A route contains a set of elements ordered sequentially that define a path in physical space as well as containing other related elements describing other useful points of interest. A route marker 602 defines a physical point as well as any associated information including the type of route marker, street information, and location name. The type of route marker can vary depending on the purpose of the marker. As shown, the route 601 is comprised of three types of markers: a route marker 602, a maneuver 603, and a waypoint 604. Other types of markers may also be provided, which provide additional information regarding the route including traffic, hazardous conditions, weather, or other points of interest 606.

A maneuver 603 indicates a change in course for the NPO, and provides instructions for the NPO controller to effect the change. A maneuver may also have additional information describing aspects of the action, including turn direction, current street, next street, and physical context (other streets at the point of maneuver). A waypoint 604 describes a destination along the path. Typically, waypoints are defined by the NPO controller, and the route between any two points is calculated by the navigation information service 610. In other cases, the waypoints of a route may be defined by an external party such as a vehicle dispatch center 609. In this example, the waypoint 605 at the beginning of the route is the origin, and similarly the last waypoint 604 at the end of the route is the final destination. Other waypoints may be defined between an origin and destination, as required, to define a route with multiple destinations. A route may also include dynamic points of interest, such as NPO 608, where the NPO controller for NPO 607 may be interested in the route with respect to NPO 608's position. In certain cases, a dynamic point of interest may be used as a waypoint, where the navigation system would need to periodically update the route information given that the NPO 608 is moving. This is discussed in further detail below. In the preferred embodiment of the present invention, the route information is defined in a portable, platform-independent format that is easily transportable between multiple devices. The route data structure 620 shows a logical organization structure for route information. A header 621 defines the basic characteristics of the route including a unique identifier, type of route (fastest, scenic, truck route, etc.), time generated, source generated, and any other information useful for managing the route information. Following the header, a list of ordered route elements 622 defines the path and waypoints in the route. Other elements 623 are also defined that provide the guidance function and navigation interface with related useful information. To provide for information that may be useful in presentation as well referenced by the route elements, additional information 624 may be stored with the route definition. This additional information may include street data, events (time based or location based), user preferences, etc. One embodiment of the route data structure 620 is to define a route information document using XML.

Figure 7:
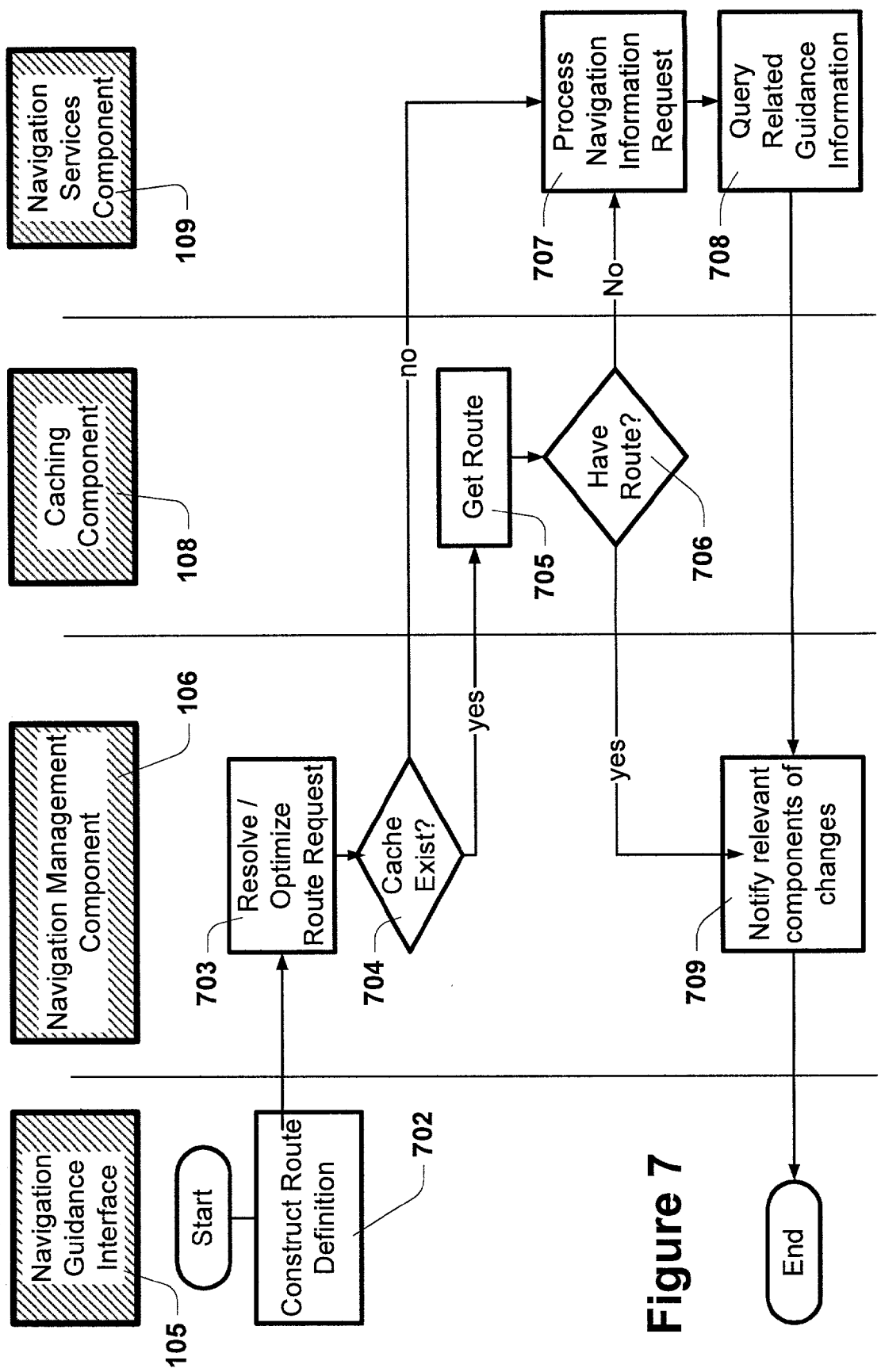
FIG. 7 is a multiple-object, process flow diagram illustrating the primary steps for defining, generating, and retrieving a route within the structure of the distributed navigation system.

The creation of a particular route requires input from the NPO controller as well as the various information sources within the navigation system. FIG. 7 shows the generalized process flow for generating a route. Prior to starting the route generation process, an NPO controller establishes a session with the navigation system, which provides a way to associate state information between the distributed navigation components. All functions are performed within the context of the session including subsequent automated guidance functions (if activated). Using the navigation guidance interface 105, at block 702, an NPO controller constructs a route definition which comprises a set of waypoints and attributes to constrain route calculation. Transferring to block 703, navigation guidance interface 105 requests from the navigation management component 106 a route satisfying the definition. The navigation management component 106 analyzes the route request, and attempts to resolve any information that is referenced but not explicitly defined within the requested definition. As will be discussed further, the route definition may contain named parameters, which are placeholders for information to be supplied by one or more navigation components. Also in step 703, the navigation management component 106 may optimize the route request in accordance with the current navigation system configuration, where one or more aspects of the definition may be modified to improve performance within the distributed environment. One example of such an optimization is to break a multiple destination route definition into several single destination route definitions, where each single destination route is calculated as needed.

At decision 704, the navigation management component 106 attempts to retrieve the specified route from the cache if it's determined that a cache function exists. If a caching component 108 exists, and has a route satisfying the route definition, then the cached route is returned to the navigation management component 106, which notifies 709 any of the other navigation components of the new route if needed. If a caching component does not exist 704 or the cache function does not have a route matching the route definition 706, a request for route calculation is sent to the navigation service component 109. The navigation service component 109 then processes, at block 707, the route request, resolving any remaining references to information, and then calculates the specified routes between the defined waypoints. Following the generation of the path, the navigation service component 109 may add additional related guidance information 708 as requested or in accordance with the session configuration. This additional information may include current traffic conditions, weather, sports events, map data, personal preferences, services and facilities along the route, points of interest, etc.

Distributed Automated Guidance

One aspect of the present invention is the ability to generalize automated guidance, such that the distribution of the navigation components on different devices, with differing network capabilities, has a minimal effect on system function. Though certain configurations may provide higher performance than others, the same navigation system functions in all configurations. With the use of a session for managing the navigation context between components of the navigation system, the system allows each function to operate independently of each other, exchanging messages when state information changes. In the present invention, guidance is defined as providing a sequence of instructions to an NPO controller for the purposes of directing an NPO along a specified route. These instructions are issued at appropriate times and locations as the NPO traverses the route. Automated guidance is guidance provided by some machine or system such as the present invention. The goal for automated guidance is to provide the NPO controller the right information at the right time and place without requiring the NPO controller to remember or store the route specification. In the case where an NPO controller is a human driver, automated guidance provides turn-by-turn instructions such that the driver is not required to remember a long list of instruction. The navigation system signals the driver of maneuvers, waypoints, and other related events as the driver proceeds along the route.

Figure 8:
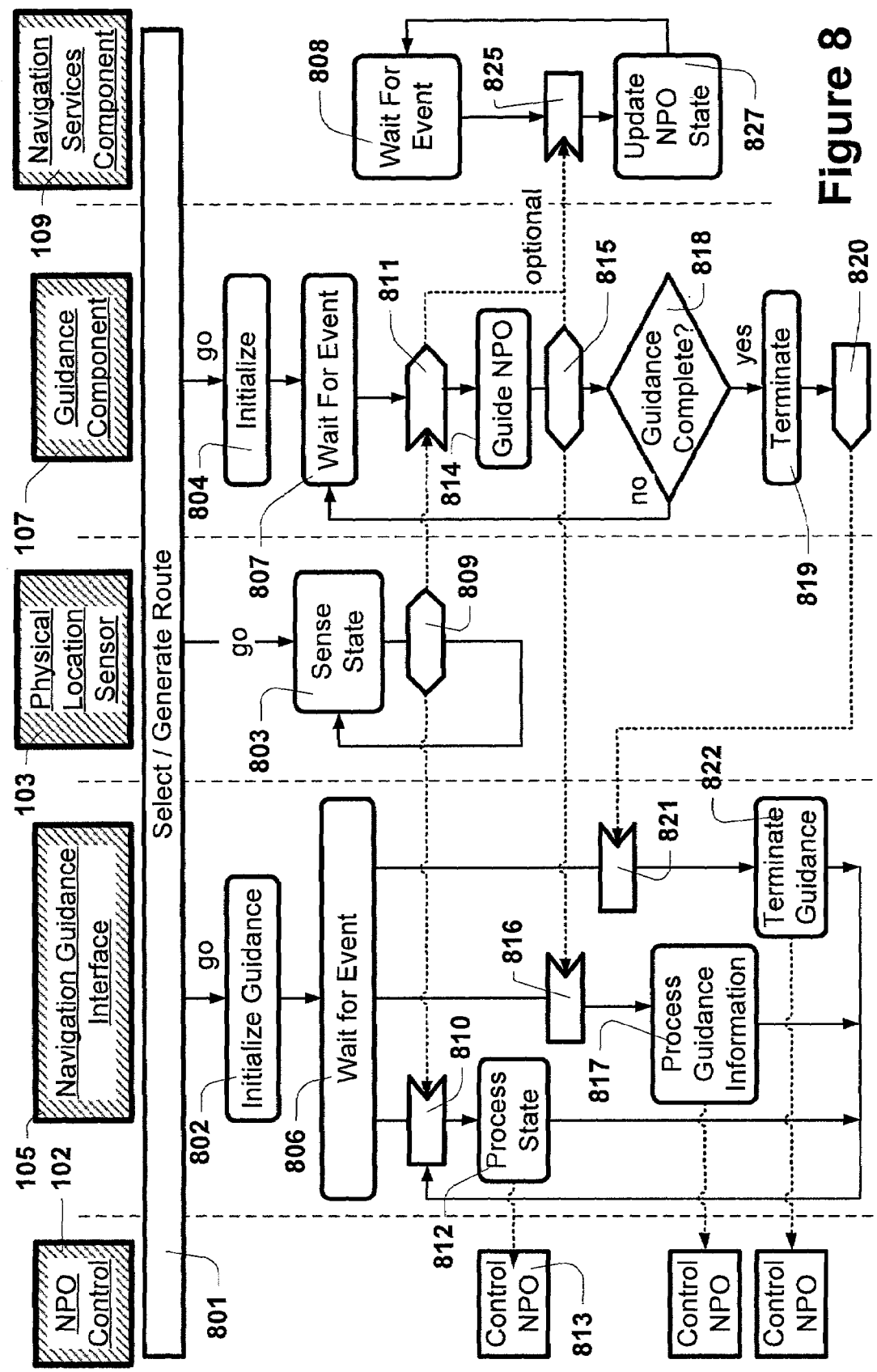
FIG. 8 is an activity diagram illustrating the actions and processes for performing automated guidance in a distributed navigation system.

FIG. 8 shows an activity diagram highlighting the functional states of each of the navigation system components during an automated navigation session. For all configurations supported by the present invention, the events and states highlighted by this diagram are essentially the same. As will be discussed further, the amount and type of information communicated between the navigation system components varies according to configuration and operating mode. Given an active navigation session with shared navigation state between navigation components 102, 103, 105, 107, and 109, a route is selected and generated 801. The defined route is usable by one or more of the navigation components. Either automatically initiated, or by an NPO controller 102 command, active guidance begins at block 802 when the navigation guidance interface 105 initializes, the physical location sensor 103 senses the current vehicle state at block 803, and the guidance component 107 initializes at block 804. The navigation guidance interface initialization 802 will vary between the types of interfaces and capabilities. Initialization actions include signaling the NPO controller 102 that automated guidance is beginning and resetting any local guidance information. Guidance component initialization at block 804 involves resetting navigation state using a priori information: the NPO initial position, and a specified route. Following initialization, the navigation guidance interface 105 and guidance component 107 enter into wait states 806 and 807. Events from other navigation components or the NPO controller 102 cause subsequent processing to occur. The navigation services component 109 also waits for events in block 808, such as updated tracking information. The physical location sensor 103 issues an update event 809 of the NPO state to the navigation guidance interface at 810 and guidance component at 811. The navigation guidance 105 interface leaves the wait state and processes the updated NPO state information at 812, which may result in one or more events to the NPO controller 102, wherein NPO control 102 is applied at 813. The guidance component 107 may also receive the update event 811, where it enters into the guide NPO state 814. State 814 may cause additional guidance status events 815 to be sent to the other navigation components as required by the particular navigation session configuration. Guidance status events are received by navigation guidance interface 105 at 816, which processes the updated guidance status 817 resulting in one or more NPO controller control operations. The guidance component 107 re-enters a wait state if guidance is not complete 818. Guidance continues until discontinued by the NPO controller or the NPO reaches the final destination. With guidance complete, the guidance component 107 terminates operation 819 and notifies 820 the other navigation components that the guidance is complete. The navigation guidance interface 105 receives the guidance complete signal 821 and terminates guidance state 822, where the NPO controller is notified, resulting in additional NPO control operations. The navigation services component 109 receives guidance status events 825, which it uses to update the NPO tracking state 827.

Events between the various navigation components shown in FIG. 8 are successfully transmitted and received only when network conditions allow. Depending on the type of configuration, some events will not reach one or more of the components at all times. In addition, events may be sent to other navigation components as provided by the particular configuration. In the preferred embodiment of the present invention, the navigation components specify which type of events will be exchanged, the minimum and maximum intervals, and sourcing components. This information is part of the system configuration and is established prior to a navigation session.

Figure 9:
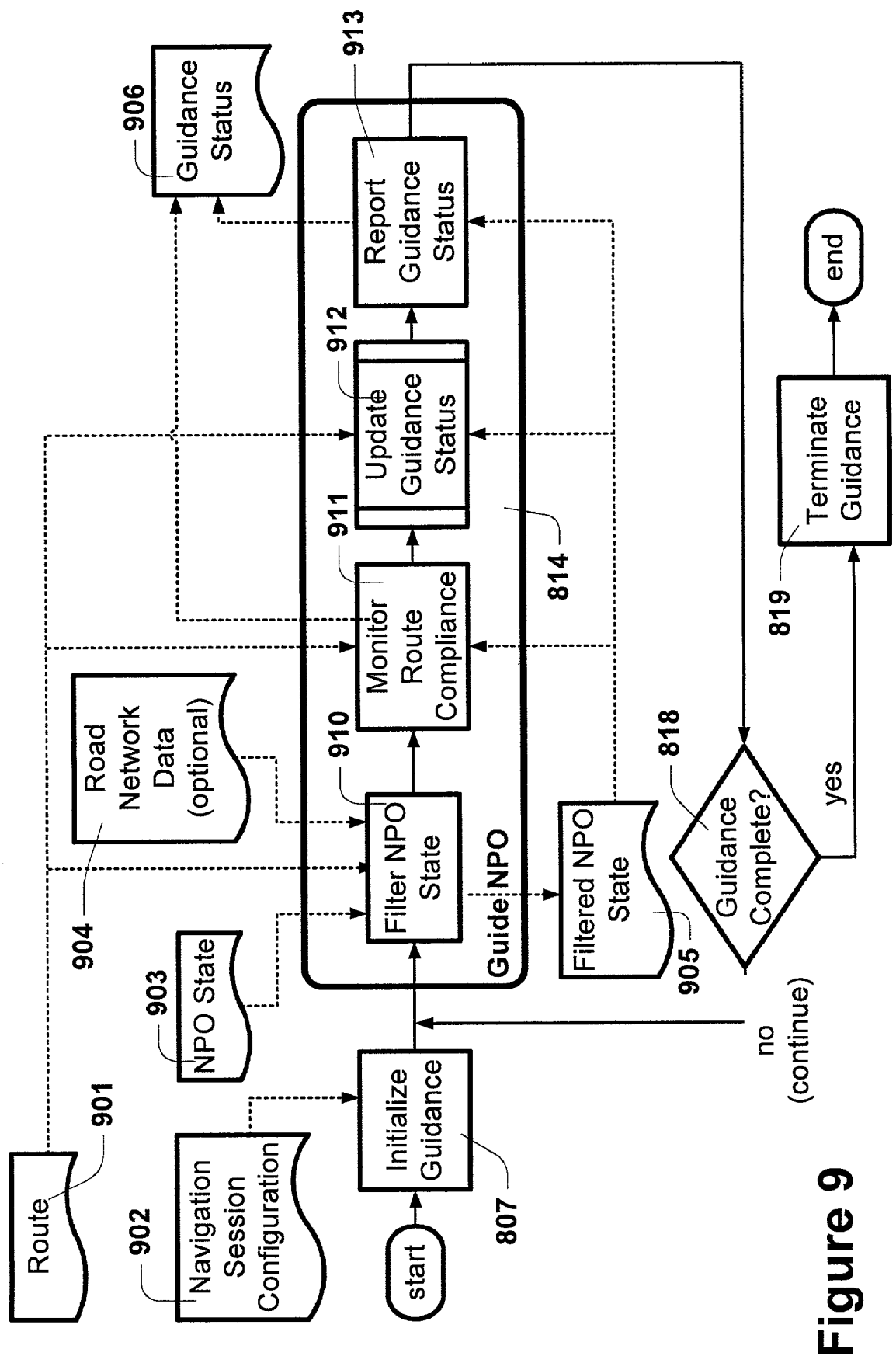
FIG. 9 is a process flow diagram illustrating the generalized steps for providing distributed automated guidance.

FIG. 9 shows the generalized process flow for automated guidance embodied in the guidance function. This figure is a more detailed view of the processes implemented by the guidance component 107 in FIG. 8. The guidance component uses the navigation session configuration information 902 to initialize the guidance component at 807 for a particular session. The configuration includes specification of guidance mode, compliance factors, and subscribers of guidance status (typically the navigation interface and/or navigation information server). Once initialized, the guidance component proceeds to guide the NPO 814 with steps comprising NPO state filtering 910, monitoring route compliance 911, updating guidance status 912, and reporting any changes to guidance status to subscribers 913. Guidance state is updated with each new observation of the NPO state 903. Guidance continues 818 until completed: either the NPO arrives at a final destination, or the guidance function is terminated by the NPO controller. If guidance is complete, the guidance component terminates at 819. Given the potential for errors in both the road network data and measurement of the NPO state, it is useful to filter the NPO state 903. The filter 910 adjusts the NPO state, compensating for the apparent error between the observed position and positions allowed by the route definition. The error is observed over an interval and is calculated using a stochastic estimation. The actual path as indicated by the NPO state 903 is compared to the expected path as defined by the route 901 or with alternate paths defined by the road network data (includes pedestrian routes) 904. The filter attempts to minimize the error between the observed and expected paths by estimating the error and applying the corrections to the current observation. The algorithm attempts to reject state observations outliers that do not fall within expected filter tolerances. Filtering the observed NPO state simplifies the complexities of monitoring route compliance 911, since transient effects and inconsistent data are not allowed to corrupt compliance algorithms. The filter 910 produces a filtered NPO state 905, which is used in subsequent processes as the 'true' state. The use of optional road network data 904 in filtering NPO state improves the means to estimate error when the NPO is off-route. When on-route the route definition is an adequate representation of the expected path. By making the provision of road network data 904 optional, the present invention can still provide an NPO state correction in configurations where only the route definition is available.

The monitor route compliance process 911 in FIG. 9 uses the route definition 901 and filtered NPO state 905 in determination of the NPO's route compliance. The process analyzes the NPOs current position, speed, and heading as well as historical information to determine if the NPO is currently 'on' or 'off' the route. The results of the compliance analysis are added to the guidance status 906. Following this, the guidance component updates the status of the route elements 912 with respect to the filtered NPO state 905 and the results from process 911. The resulting status information is added to the guidance status 906. The report guidance status 913, adds the filtered NPO state information 905 to the guidance status 906, and communicates the completed status to all guidance component subscribers.

Figure 10A:
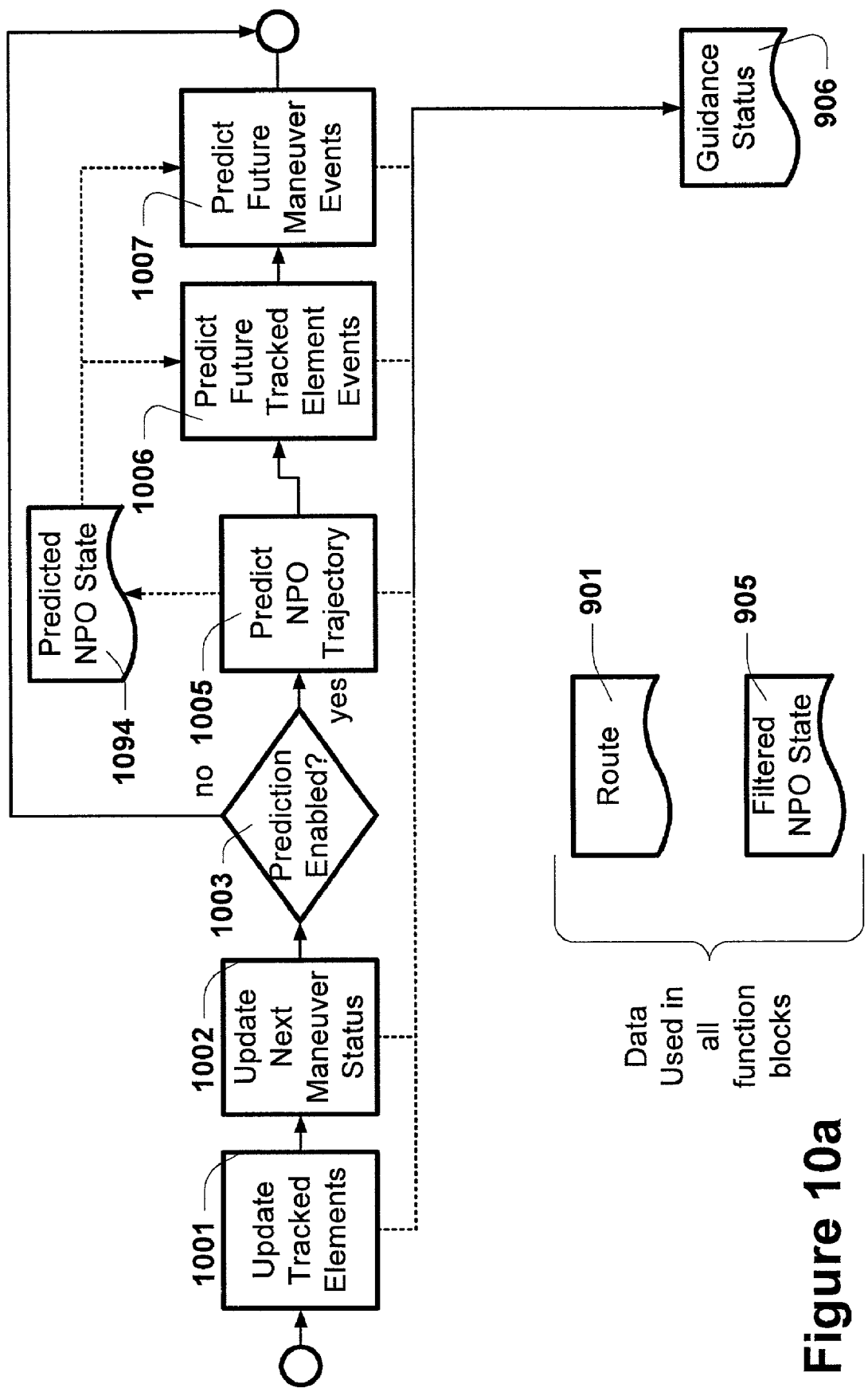
FIGS. 10a and 10b are process flow diagrams illustrating in more detail the steps for updating guidance status, including predictive guidance information.
Figure 10B:
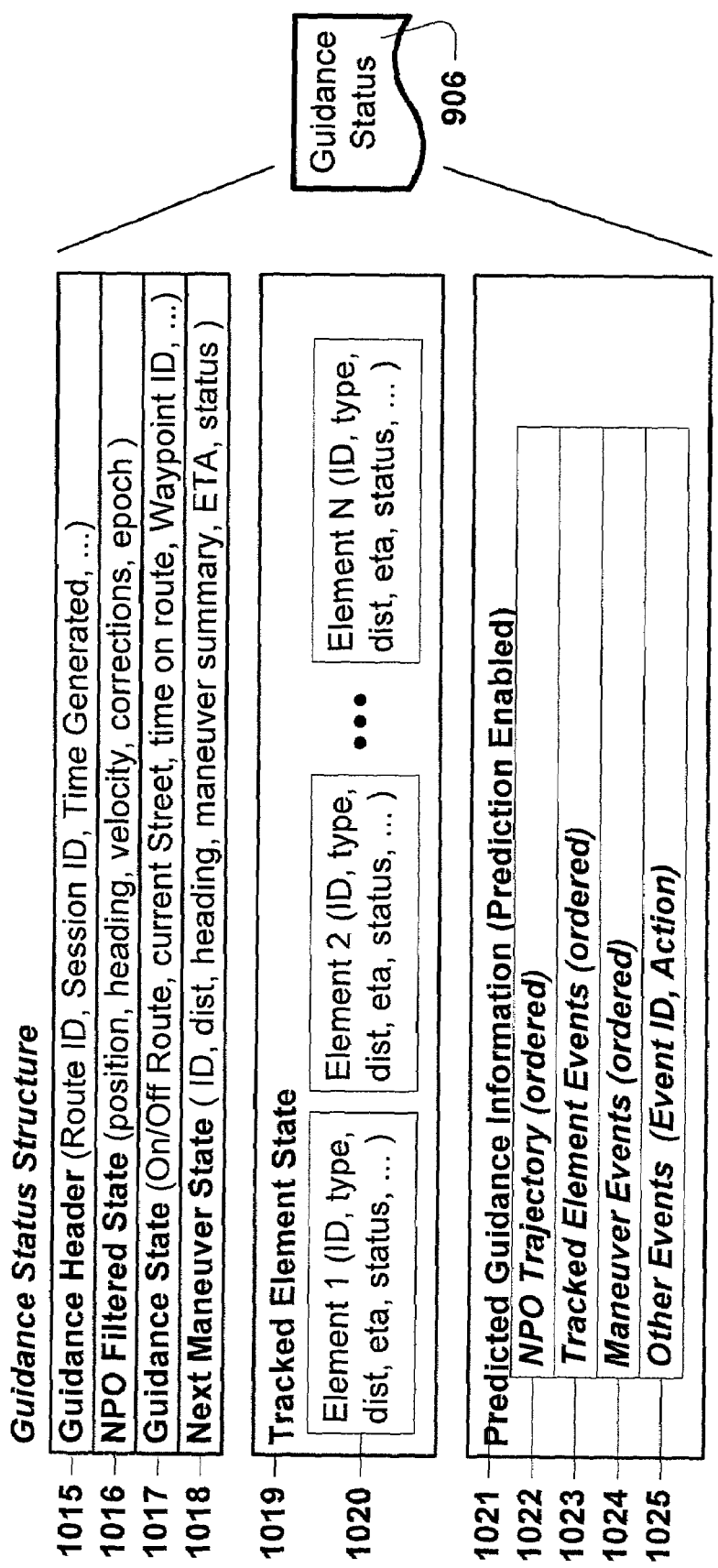

FIGS. 10a and 10b show the process detail for updating the guidance status 912. The route definition 901 and filtered NPO state 905 are used by each of the process blocks 1001, 1002, 1005, 1006, and 1007. Block 1001 updates the current state of each of the tracked elements, which are any of the route elements 622 or 623 of FIG. 6 in the route definition 901, with an attribute flag indicating it's a tracked element. Waypoints, maneuvers, and other points of interest are typically tracked elements, where the NPO controller is provided regular updates as to the status with respect to each element along the route of travel. The current states of these elements with respect to the NPO are listed 1019 (FIG. 10b) in the guidance status 906, where the state of each element 1020 (FIG. 10b) with respect to the filtered NPO state includes the estimated distance along route, estimated time of arrival, status flags, element identifier and element type. The update next maneuver status 1002 calculates the next maneuver state 1018, which provides more detailed information about the next NPO controller action than provided by the tracked element status. The maneuver state indicates the maneuver ID, distance to maneuver, heading, a summary of the maneuver actions (turn right, left, etc), and other status indicators, such as execution status. The execution status provides the means to indicate when the NPO controller should execute a maneuver. One embodiment of the present invention uses a four-state progression: (1) maneuver alert, (2) maneuver pending, (3) execute maneuver, and (4) maneuver complete. The next maneuver status may also indicate a series of related maneuvers, where the maneuvers are in close proximity to each other, requiring some coordinated action between them.

In all cases, the guidance component updates the current state of the tracked elements and next maneuver. To support system configurations where the guidance component cannot provide frequent guidance status to subscribers as discussed in the section "Remote Guidance Configuration," the guidance component provides additional functionality to predict future status of the NPO trajectory, tracked elements, and maneuvers. As shown in FIGS. 10a and 10b, if prediction is enabled 1003, the guidance component predicts the NPO trajectory 1005 such that it estimates future NPO state 1004 at certain locations or timeframes. The predicted trajectory is added to the guidance status at 1022, which allows subscribers to monitor for significant deviation. The future state for each of the tracked elements is then calculated with respect to the predicted NPO state 1004 and any significant state changes are added as events 1023 in the guidance status. Similarly, the status for future maneuvers is predicted with respect to the predicted NPO state and any significant changes are added as maneuver events 1024 in the guidance status. The predicted guidance information may also include other events 1025, where a particular event identified with a unique identifier has a particular action. Actions may involve additional processing or state changes, including messaging to one or more of the navigation system components. The guidance header 1015 provides information including the associated route, associated navigation session, and time generated, that provides subscribers with the ability to integrate the status information with other information. The NPO filtered state 1016 is also provided including the NPO estimated position, heading, velocity, current filter corrections, and timeframe. The guidance state 1017 indicates route compliance information as well as other route-related information including: current street name, time on route, next waypoint ID, last waypoint ID, next route marker ID, previous route marker ID, etc.

All events are estimated with a probability of occurrence given the current state, including an estimate of the approximate time and location of the event. Events occurring earlier than other events typically have a higher probability of occurrence given the ability to accurately predict the actual NPO trajectory. Assuming the NPO will not deviate significantly from the defined route, events can be defined with respect to the NPO's position along the route such that, when the NPO reaches a certain position, the event is triggered. This allows errors in event triggers to be minimized due to the uncertainty in the rate of flow along the route and other variables. The events are ordered as a function of position along the route and time such that subscribers processing the data need only work with one event at a time. The event is triggered when the along-route distance reaches a minimum and the cross-route distance is within a specified tolerance (e.g., 75 meters). Estimated time of the event is also provided as an internal system check, such that if the actual timeframe compared with the estimated timeframe is not within a specified tolerance, then the accuracy of the event information should be questioned. These simple tests for tolerance provide the means to determine if another guidance status update is required. In the preferred embodiment of the present invention, a navigation interface using predicted guidance information monitors these tolerances and signals for a guidance update, when any of the tests fail.

Local Guidance Function

In configurations where the guidance component, navigation guidance interface, and physical location sensor are on the same high-speed and low-latency network as discussed in the section Local Guidance Configuration, the method of automated guidance can be conducted in real time without the need for predicting future events. In this mode, feedback is immediate: the guidance component receives continuous physical state updates and notifies the user interface of the latest guidance status with little or no delay. Predictive features are disabled. In this configuration, the bulk of the guidance behavior is handled by the guidance component, allowing the navigation guidance interface to simply respond in a passive manner to the changing guidance and physical state.

Figure 11:
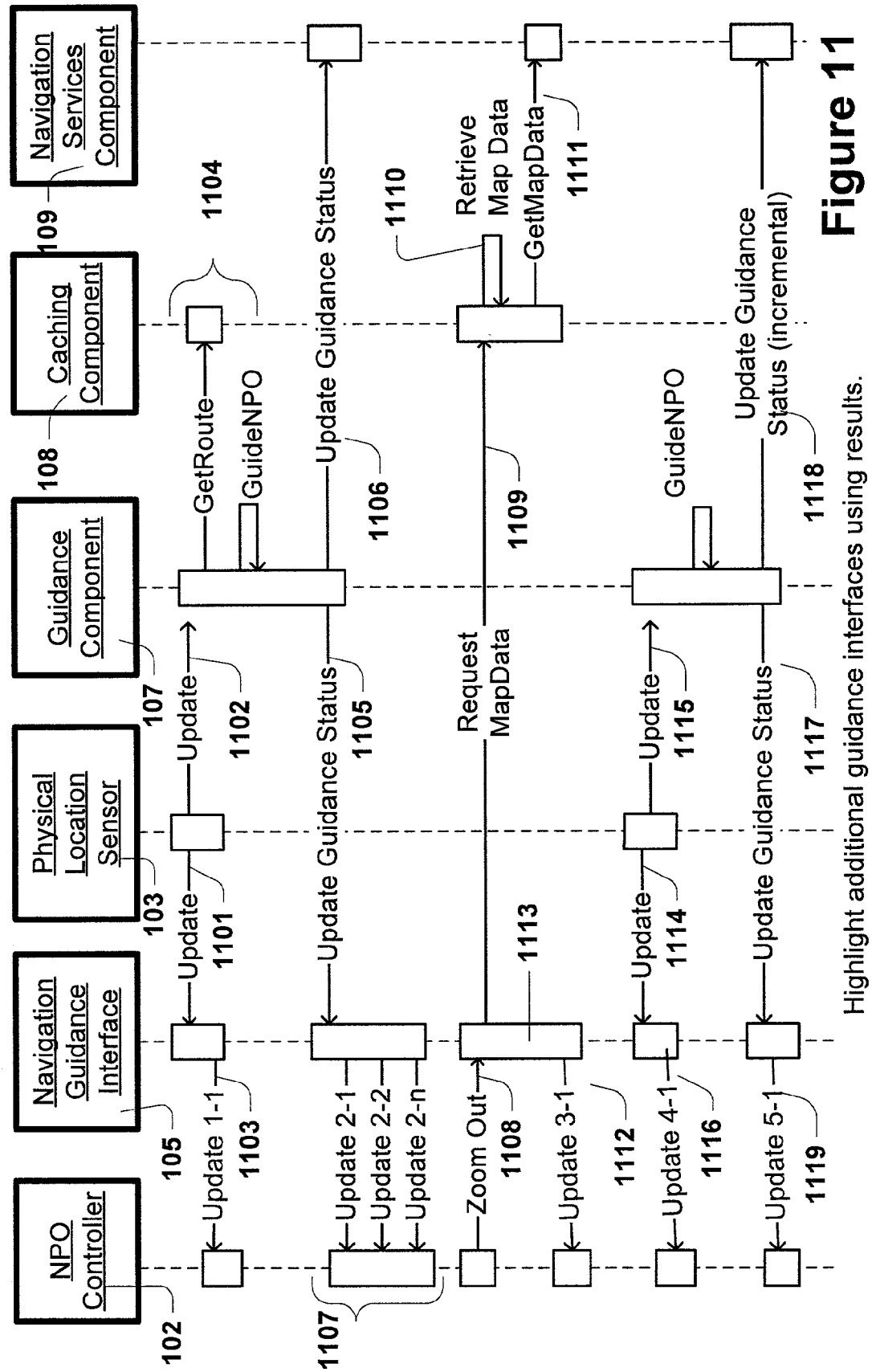
FIG. 11 is a sequence diagram showing one illustrative example of automated guidance in which the navigation system is configured as shown in FIG. 2.

FIG. 11 shows an illustrative automated guidance sequence for the local guidance configuration described in FIG. 2, where an NPO controller 102 interacts with the navigation system through navigation guidance interface 105 and other navigation system components 103, 107, 108, 109. Following selection of a route and activation of the automated guidance function, the system proceeds to process physical state updates 1101 and 1102. State update 1101 causes the navigation guidance interface 105 to issue an interface update 1103. Update 1102, sent to the guidance component 107, causes the guidance component to perform the sequence 1104, where route information is retrieved from the caching component 108 and a guide NPO method is executed. The resultant guidance status changes are sent to navigation guidance interface 105 (event 1105) and navigation services component 109 (event 1106). Guidance status 1106 is sent via the WAN network to the navigation services component 109, where the tracking information is updated accordingly. Guidance status 1105 is sent to the navigation guidance interface 105 where a series of messages 1107 are sent to the NPO controller 102. With the structure of the guidance status containing multiple types of status and state information, the navigation guidance interface 105 may initiate multiple interface messages because of a single guidance status update. The preferred embodiment of the present invention bundles status updates into one message in order to minimize network traffic.

Continuing with the illustrative sequence in FIG. 11, at some later timeframe, the NPO controller 102 commands the navigation guidance interface 105 to 'zoom out', 1108. This would be a typical command for a navigation guidance interface, where the user requests the navigation system to zoom out showing a map covering a larger area than the current map. The event 1108 causes the navigation guidance interface 105 to request map data 1109 from the caching component 108. The caching component 108 queries attempts to find the requested information locally but without success. The caching component 108 then queries 1111 the navigation services component 109 for the specified map information and waits for the results. The resulting data is stored locally in caching component 108 for subsequent use and guidance component 107 returns the resulting data to the navigation guidance interface 105, where the 'zoom out' command is completed, with NPO controller notification 1112. The processing 1113 of the 'zoom out' command was shown as a synchronous blocking process, where the processing control is not returned until the command is completed. In the present invention both asynchronous non-blocking and synchronous blocking types of processing can be used to accomplish the same function. Which form is used depends upon the operation being executed and the specific embodiment of the system. In the preferred embodiment, both types of processing are used: asynchronous nonblocking-type messages are used for notification and events, such that the caller does not have to wait for a response; and synchronous blocking-type messages that are used when the caller's subsequent actions depend on the results on the response to the message. Physical location sensor 103 issues state update messages 1117 and 1118 (similar to 1101 and 1102), where navigation guidance interface 105 updates its state and notifies, at 1116, the NPO controller 102. The guidance component 107 processes the update again using the guide NPO method, where navigation messages 1117 and 1118 are sent. Message 1117 is a complete guidance status message containing the complete guidance state information. Message 1118 is an incremental guidance status message containing only the changes since message 1106 of the current guidance state. The preferred embodiment of the present invention provides the means to filter the content of messages between navigation system components in accordance with configuration and optimization parameters. In this example, the navigation services component 109 is connected by a WAN, where limited data transfer rates require minimizing the amount of network traffic when possible. The guidance component 107 strips the redundant information from message 1118 prior to sending it to the navigation services component.

Remote Guidance Function

For configurations where the guidance component, navigation guidance interface, and, navigation services component operate remotely using a WAN configuration, as shown in FIG. 4, with potentials for low data rates, high latency, and intermittent connections, predictive guidance messages offer a means to provide automated guidance. In this mode, the remote automated guidance component issues guidance status messages containing both the current state and predicted navigation status events, where the navigation guidance interface receives these status messages infrequently and uses the predicted information to guide the user between updates. The quality of automated guidance will be somewhat less than provided by a local guidance configuration, but benefits system designers by enabling navigation on devices with limited processing and memory capabilities. The quality is dependent upon the frequency of guidance status updates. Typically, the update intervals in the preferred embodiment are between 5 and 30 minutes. Longer intervals are possible but are likely to yield poor results if the NPO deviates significantly from the expected route.

Figure 12A:
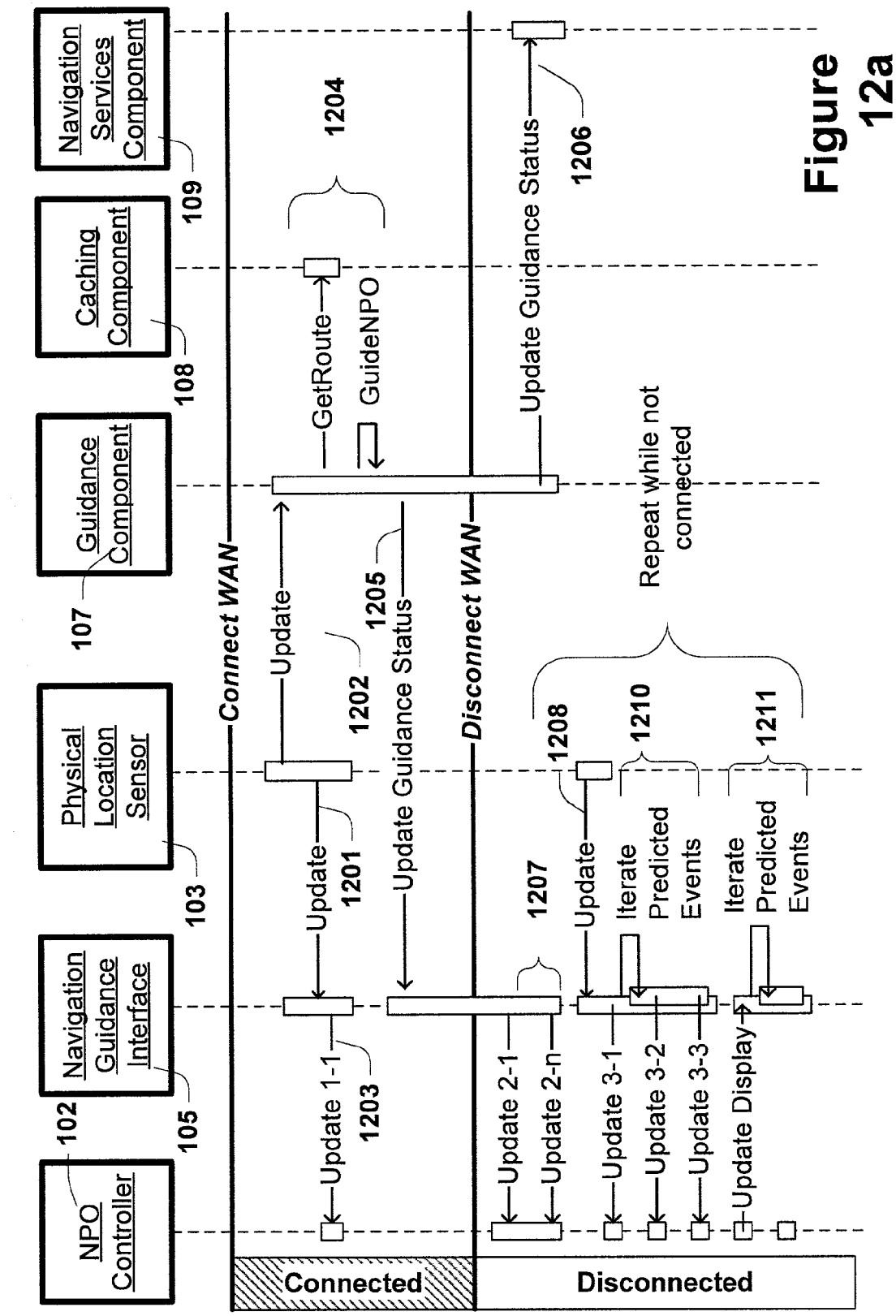
FIGS. 12a and 12b are sequence diagrams showing one illustrative example of automated guidance in which the guidance component is remotely operated with respect to the navigation guidance interface as shown in FIG. 4.
Figure 12B:
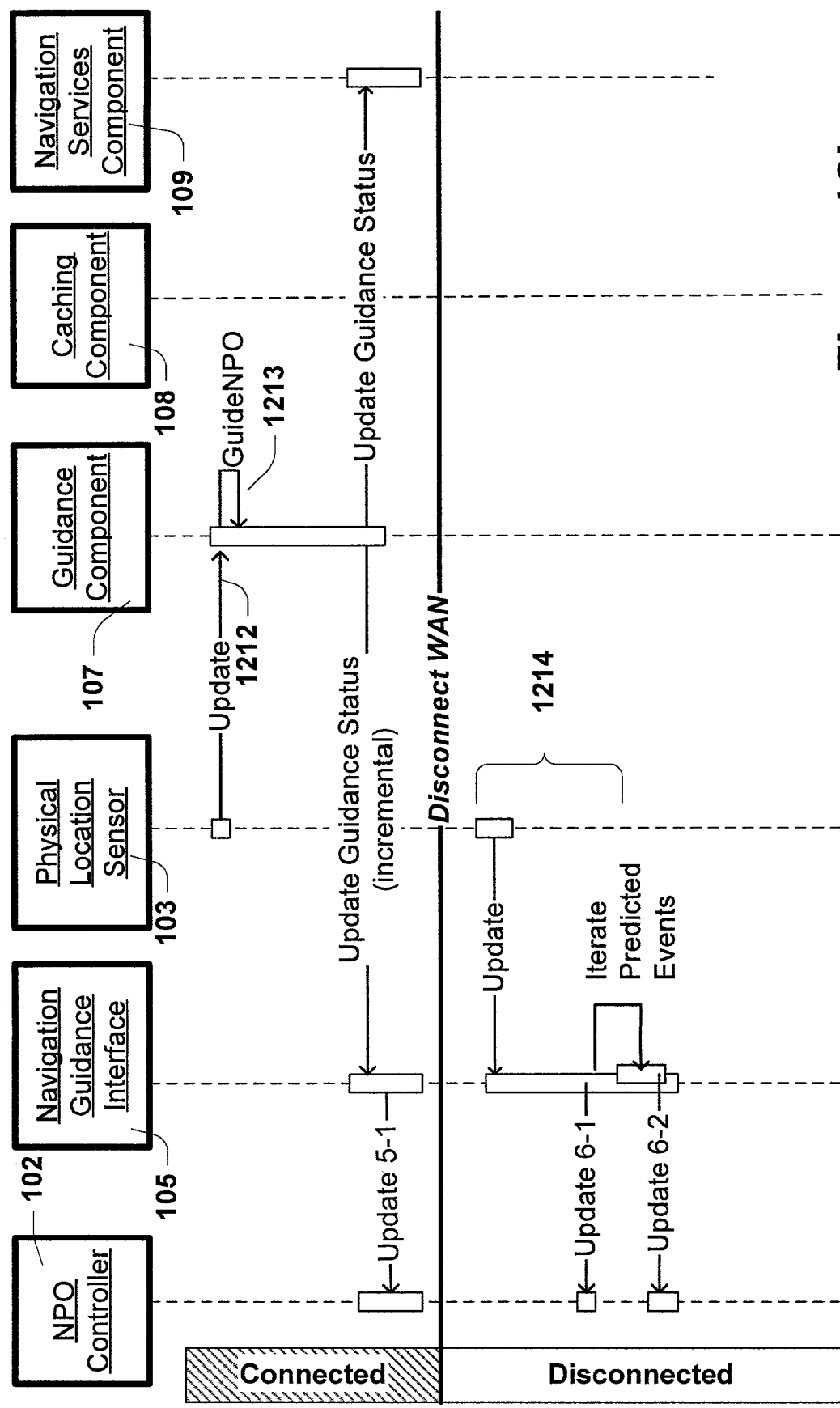

FIGS. 12a and 12b show an illustrative sequence between an NPO controller 102 and the navigation system components 105, 103, 107, 108, and 109. In this configuration, the guidance component 107 is remotely located and connected using a WAN similar to the configuration of FIG. 4. The physical location sensor 103 sends messages 1201 and 1202 notifying the navigation guidance interface 105 and guidance component 107 of the current NPO's state. The message 1201 is processed by the navigation guidance interface 105, which results in sending the message 1203 to the NPO controller 102. A WAN connection is established prior to sending message 1202 to the guidance component 107. Once sent, the guidance component 107 processes the NPO state 1204 and sends the guidance status 1205 to the navigation guidance interface 105. At this point, WAN connection between the guidance component 107 and navigation guidance interface 105 is disconnected. The guidance component 107 sends a status message 1206 to the navigation services component 109, which is communicated through a high-speed network. The navigation guidance interface 1207 processes the guidance status state changes, updating the NPO controller 102 as required. Later, the physical state sensor 103 sends an update 1208 to the navigation guidance interface 105 (assuming 103 and 105 are connected locally without the WAN), where the navigation guidance interface 105 notifies the NPO controller 102 of the latest state changes 1209. In addition, the navigation guidance interface 105 iterates the predicted events 1210, where it checks to see if any of the trigger conditions have been met. Any triggered events are processed accordingly with notifications to the NPO controller 102. In the present invention the method of predicted event processing is specific to the particular embodiment. In certain situations the events may be processed one at a time as encountered along the route. Other situations may iterate the entire list of events for each update (as shown) to provide for multiple triggers at one time. NPO controller events can also cause the navigation guidance interface 105 to process predicted information 1211 as certain NPO controller events constitute a trigger condition, where the navigator examines the list of predicted events searching for any matches. NPO controller events such as 'update status now' or 'disable navigation' are examples of predicted events, which may have a corresponding predicted action. The steps 1208 through 1211 are repeated for each event (physical state update or NPO controller event) while disconnected from the WAN. No state updates are sent to the guidance component 107.

At a subsequent point in time, the WAN connection is reestablished and a NPO physical state update 1212 is sent to the guidance component 107 as shown in FIGS. 12a and 12b. The guidance component 107 processes the latest state information and sends an incremental guidance status update 1213 to the navigation guidance interface 105, comprising the changes and predicted events since the last update 1205. The navigation guidance interface 105 processes any immediate state changes, whereupon the WAN is again disconnected. Once disconnected, the navigation guidance interface 105 processes subsequent physical state updates and NPO controller events 1214, until the connection is once again established. This process continues until the NPO controller discontinues automated guidance or the final destination is reached.

Off-route or reroute events are handled in much the same manner as other route guidance data, in that the guidance component 107 may determine that the NPO is significantly off-route such that a new or alternate route may be warranted. In these situations, the guidance component 107 would notify the navigation guidance interface 105 to update the route information. Other reroute events may also be sent from the navigation services component 109 in response to changes in the route state, such as traffic or other path impedances. For the remote guidance configuration, a reroute event may not occur until the next guidance update.

Coordinated Navigation Between Multiple Navigation Sessions

Using a distributed approach, an additional aspect of the invention provides the means to coordinate navigation and guidance information between multiple navigation sessions. This is useful for situations in which the control and state of one or more NPOs are related to other NPOs. For example, consider a first NPO that is traveling a route without a specific destination. A second NPO can track and receive guidance instructions relative to the route traveled by the first NPO, where the second NPO is guided according to the first NPO's location.

Navigation sessions comprising a configuration of navigation system components are grouped together by some external configuration means, wherein a first session within a group shares state information with other navigation sessions of the same group. The type of information shared depends upon group and session configurations. FIG. 13 shows an illustrative configuration of navigation sessions organized into groups. Group 1301 contains three sessions, where navigation session 1304 is also part of group 1303. A first navigation session can participate in multiple groups, where the first session shares navigation state with sessions in first and second groups, but other navigation sessions in the first and second group do not share navigation state. For example, session 1304 sees the other navigation sessions in groups 1301 and 1303, but the other sessions of group 1301 do not share navigation state with the other sessions of group 1302. Sessions only share the state to which the session belongs. In the present invention, groups provide the means to organize and control session state visibility. Groups are administered by associated navigation services component 109. Groups may also have one and only one session, such as group 1302 and navigation session 1306. In the preferred embodiment of the present invention, multiple instances of the navigation services component 109 may administer the same groups, providing a means to scale the configuration to handle large numbers of navigation sessions concurrently.

Figure 14:
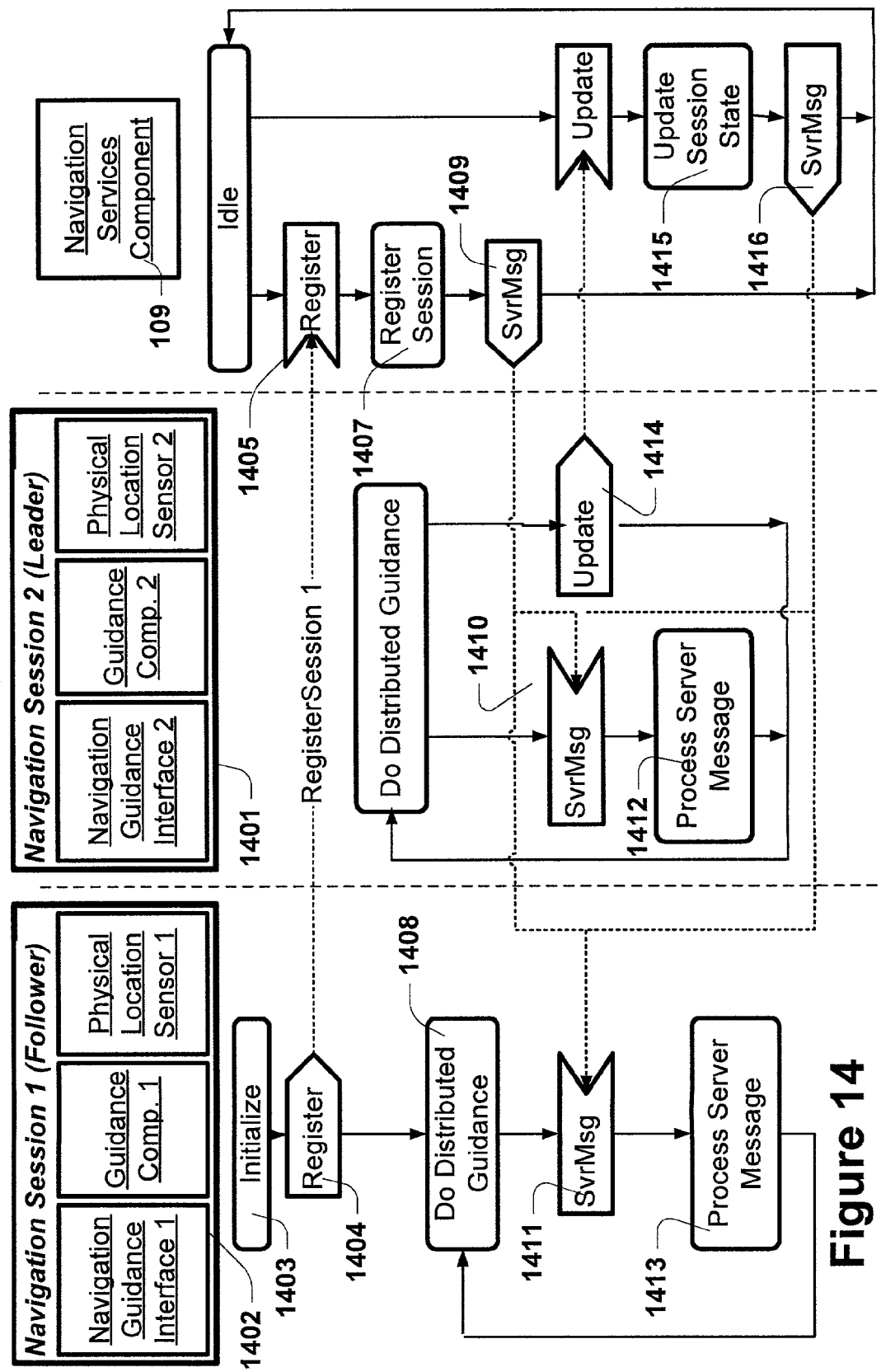
FIG. 14 is an activity diagram illustrating the actions and processes for coordinated navigation and guidance information between a plurality of navigation sessions and a navigation services component.

FIG. 14 shows an activity diagram illustrating the method for coordinating navigation information between two navigation sessions. The method uses the navigation services component 109 to coordinate the delivery of information to a particular group of navigation sessions. Given a previously initialized and executing navigation session 1401, a new navigation session 1402, and a navigation services component 109, the diagram shows the general process for registering and updating the shared session state. Navigation session 1402 is initialized such that it will join the group containing session 1401. The session then transitions to its operation state sending a request for registration 1404 with appropriate authentication credentials. Session 1402 enters into state 1408, which performs the distributed navigation methods described in the section "Distributed Automated Guidance." The registration message is received 1405 by navigation services component 109 and is processed by session registration 1407. Upon successful registration, the server notifies 1409 all navigation sessions of the new session. The message is received by 1410 and 1411 and processed by the process server message 1412 and 1413. The server notifies all sessions of state changes via the navigation server. The navigation services component 109 coordinates the delivery of the information at appropriate times, given that some elements of a navigation system may not be immediately accessible given intermittent connectivity. Guidance state or NPO state updates 1414 are handled in a similar manner. The server receives the message and processes the updated state information 1415. The navigation services component 109 issues update messages to each of the navigation sessions requiring the updated information. The server messages are received by 1410 and 1411 and processed by the process server message 1412 and 1413. Depending upon the configuration and network availability, messages to each of the navigation sessions may contain different content in order to minimize network usage or to optimize subsequent processing.

With coordinated navigation between multiple navigation sessions, the present invention can provide useful features not available in prior art. For example, a guidance function can provide a feature that allows multiple navigation sessions to follow a first navigation session, where the location, heading, and speed of the first navigation session are communicated to the other sessions for subsequent guidance. In another example, coordinated navigation provides the means for multiple navigation sessions to track the progress and route of the other sessions; additionally navigation sessions can share routes and destinations dynamically allowing for follow-the-leader types of scenarios.

BENEFITS OF THE PRESENT INVENTION

Various benefits are realized by the embodiments of the present invention, as described above. One benefit is that the components of the navigation system may be implemented independently because they are only loosely coupled through a network. Another benefit realized is configuration flexibility: a system integrator can choose the physical devices on which the components run according to engineering trade-offs such as processor performance, communication latency, communication bandwidth utilization, hardware costs, device availability, and network availability. The components may also be implemented in a device independent manner, such as written in Java, that enables the components to be easily moved from one device to another. The system also enables communication and coordination between navigation sessions, creating advanced navigation applications such as "follow the leader," or navigation toward a moving destination.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A distributed navigation system for providing navigation information to a navigable physical object, the system comprising:
   (a) a navigation management component for managing the generation and transmission of navigation information to a navigable physical object;
   (b) a navigation guidance interface component for:
      (i) receiving a route definition pertaining to the navigable physical object; and
      (ii) transmitting navigation information generated by the distributed navigation system to the navigable physical object controller;
   (c) a guidance component for generating the navigation information for the navigable physical object;
   (d) a navigation services component for providing routing information to the distributed navigation system; and
   (e) a physical location sensor component for obtaining the physical location of the navigable physical object;
   wherein the components of the distributed navigation system or software components distributed on a plurality of networked computers in a distributed network external to the navigable physical object; and
   wherein the components of the distributed navigation system communicate among themselves through the distributed network using a computer network protocol.

2. The distributed navigation system of claim 1 further comprising a caching component for temporarily storing navigation information for the navigable physical object while communications between the distributed navigation system and the navigable physical object are interrupted.

3. The distributed navigation system of claim 1, wherein managing the generation and transmission of navigation information to a navigable physical object comprises:
   (a) receiving the route definition pertaining to the navigable physical object;
   (b) constructing a navigation route for the navigable physical object according to the route definition and the routing information;
   (c) initiating the generation of navigation information for the navigable physical object; and
   (d) initiating the transmission of the navigation information to the navigable physical object.

4. The distributed navigation system of claim 3, wherein generating the navigation information for the navigable physical object comprises generating the navigation information for the navigable physical object according to the physical location of the navigable physical object, the routing information, and the navigation route for the navigable physical object.

5. The distributed navigation system of claim 3, wherein the routing information provided by the navigation services component comprises:
(a) mapping and geocoding guidance information; and
(b) point-of-interest guidance information.

6. The distributed navigation system of claim 5 further comprising a mapping and geocoding services component for providing mapping and geocoding guidance information to the navigation services component.

7. The distributed navigation system of claim 5 further comprising a point-of-interest guidance component for providing point-of-interest guidance information to the navigation services component.

8. The distributed navigation system of claim 3, wherein the navigation information generated by the guidance component includes predictive navigation information comprising predictive guidance information for the navigable physical object, generated according to a prediction criterion, for guiding the navigable physical object according to the navigation route, and wherein the predictive navigation information is stored by the caching component for subsequent retrieval.

9. The distributed navigation system of claim 8, wherein the prediction criterion comprises a predicted physical location for the navigable physical object according to a speed and a heading of the navigable physical object.

10. The distributed navigation system of claim 8, wherein the prediction criterion comprises a predicted physical location for the navigable physical object according to a navigation route for the navigable physical object.

11. A method for providing navigation information for a navigable physical object by a distributed navigation system, the distributed navigation system comprising a plurality of software components distributed on a plurality of computers external to the navigable physical object and communicating via a computer network protocol, the method comprising:
receiving a route definition pertaining to the navigable physical object;
constructing a navigation route for the navigable physical object according to the route definition;
generating navigation information for the navigable physical object according to the navigation route;
providing the navigation information to the navigable physical object;
generating predictive navigation information for the navigable physical object according to a prediction criteria;
storing the predictive navigation information in a cache component; and
providing the predictive navigation information from the cache component to the navigable physical object when the predictive navigation information corresponds to the physical location of the navigable physical object.

12. The distributed navigation system of claim 8, wherein the predictive navigation information is further generated according to previously generated navigation information.

13. The distributed navigation system of claim 8, wherein the navigation guidance interface component obtains the predictive navigation guidance information from the caching component when the predictive navigation information corresponds to the physical location of the navigable physical object.

14. The distributed navigation system of claim 1, wherein the components of the distributed navigation system are distributed on the plurality of networked computers in the distributed computer network according to the communication abilities of the plurality of networked computers.

15. The distributed navigation system of claim 14, wherein distributing the components of the distributed navigation system on the plurality of networked computers in the distributed computer network according to the communication abilities of the plurality of networked computers comprises distributing the components on a plurality of networked computers having low latency, high bandwidth connections to the network.

16. The distributed navigation system of claim 1, wherein the components of the distributed navigation system are distributed on the plurality of networked computers in the distributed computer network in order to optimize communication throughput among components of the distributed navigation system.

17. The distributed navigation system of claim 1, wherein the components of the distributed navigation system are distributed on the plurality of networked computers in the distributed computer network in order to optimize communication reliability to the navigation guidance interface.

18. The distributed navigation system of claim 1, wherein the distributed navigation system generates navigation information for a plurality of navigable physical objects.

19. The distributed navigation system of claim 18, wherein the navigation management component coordinates navigation information between a plurality of navigable physical objects, such that the physical location of and navigation information generated for a first navigable physical object is used in generating navigation information for a second navigable physical object.

20. The distributed navigation system of claim 18, wherein the components of the distributed navigation system are distributed on the plurality of networked computers in the distributed computer network in order to optimize communication throughput of navigation information for the plurality of navigable physical objects.

21. The distributed navigation system of claim 20, wherein distributing the components of the distributed navigation system on the plurality of networked computers in the distributed computer network in order to optimize communication throughput of navigation information for the plurality of navigable physical objects comprises distributing the components on a plurality of networked computers in the distributed computer network having low latency, high bandwidth network connections.

22. The distributed navigation system of claim 20, wherein distributing the components of the distributed navigation system on the plurality of networked computers in the distributed computer network in order to optimize communication throughput of navigation information for the plurality of navigable physical objects comprises distributing the components on a plurality of networked computers in the distributed computer network having highly reliable network connections.

23. A method for providing navigation information for a navigable physical object by a distributed navigation system, wherein the components of the distributed navigation system are software components distributed on a plurality of networked computers in a computer network external to the navigable physical object, and wherein the components of the distributed navigation system communicate among each other using a computer network protocol, the method comprising:

(a) receiving, at a first component of the distributed navigation system, a route definition pertaining to a navigable physical object;

(b) constructing, at a second component of the distributed navigation system, a navigation route for the navigable physical object according to the route definition and routing information obtained from a third component of the distributed navigation system using a network protocol;

(c) sensing, at a third component of the distributed navigation system, the physical location of the navigable physical object;

(d) generating, at a fourth component of the distributed navigation system, navigation information for the navigable physical object according to the physical location of the navigable physical object, the routing information, and the navigation route; and (e) transmitting the navigation information to the navigable physical object via the first component;

wherein the components of the distributed navigation system are distributed on at least two networked computers in the computer network external to the navigable physical object.

24. The method of claim 23 further comprising repeatedly generating and transmitting navigation information to the navigable physical object until a condition occurs.

25. The method of claim 24, wherein the condition occurs when the navigable physical object arrives at a destination identified in the route definition.

26. The method of claim 24, wherein the condition occurs when the distributed navigation system is directed to stop providing navigation information for the navigable physical object.

27. The method of claim 23, wherein the routing information comprises mapping and geocoding guidance information.

28. The method of claim 23, wherein the routing information comprises point-of-interest guidance information.

29. The method of claim 23, wherein providing navigation information for a navigable physical object to the navigable physical object further comprises:

storing the generated navigation information in a cache component when the distributed navigation system is unable to transmit the navigation information to the navigable physical object;

retrieving the stored navigation information from the cache component when the distributed navigation system is able to transmit the navigation information to the navigable physical object; and transmitting the navigation information to the navigable physical object via the first component.

30. The method of claim 23, further comprising:

generating predictive navigation information for the navigable physical object according to a prediction criterion;

storing the predictive navigation information in a cache component;

retrieving the predictive navigation information from the cache component when the predictive navigation information corresponds to the physical location of the navigable physical object; and transmitting the predictive navigation information to the navigable physical object.

31. The method of claim 30, wherein the prediction criterion comprises a predicted physical location according to a speed and a heading for the navigable physical object.

32. The method of claim 30, wherein the prediction criterion comprises a predicted physical location according to the navigation route for the navigable physical object.

33. The method of claim 11, wherein the prediction criterion comprises a predicted physical location according to a speed and a heading for the navigable physical object.

34. The method of claim 30 further comprising generating the predictive navigation information for the navigable physical object according to previously generated navigation information.

35. The method of claim 23 further comprising generating navigation information for a plurality of navigable physical objects.

36. The method of claim 35, wherein generating navigation information for a plurality of navigable physical objects comprises generating navigation information for a plurality of navigable physical objects such that the navigation information generated for a first navigable physical object is used to generate navigation information for a second navigable physical object.

37. A method for providing navigation information for a navigable physical object by a distributed navigation system, comprising:

(a) receiving a route definition pertaining to the navigable physical object by a navigation guidance interface component of the distributed navigation system and transmitting the route definition to a navigation management component of the distributed navigation system;

(b) constructing, using the navigation management component, a navigation route for the navigable physical object according to the route definition and routing information, wherein the routing information is obtained from a navigation services component of the distributed navigation system, the routing information comprising:

(i) mapping and geocoding guidance information obtained from a mapping and geocoding services component of the distributed navigation system; and (ii) point-of-interest guidance information obtained from a point-of-interest component of the distributed navigation system; and (c) sensing the physical location of the navigable physical object with a physical location sensor of the distributed navigation system and transmitting the physical location to a guidance component of the distributed navigation system;

(d) generating navigation information for the navigable physical object, using a guidance component, according to the physical location of the navigable physical object, the routing information, and the navigation route; and (e) transmitting the navigation information to the navigable physical object through the navigation guidance interface;

wherein the components of the distributed navigation system are distributed on a plurality of networked computers in a computer network external to the navigable physical object, and wherein the components of the distributed navigation system communicate via a computer network protocol.

38. The method of claim 37 further comprising repeatedly generating and transmitting navigation information for the navigable physical object until a condition occurs.

39. The method of claim 38, where the condition occurs when the navigable physical object arrives at a destination identified in the route definition.

40. The method of claim 38, where the condition occurs when the distributed navigation system is directed to stop providing navigation information for the navigable physical object.

41. The method of claim 37, wherein providing navigation information to a navigable physical object further comprises:
   storing navigation information with a caching component of the distributed navigation system when the distributed navigation system is unable to transmit the navigation information to the navigable physical object through the navigation guidance interface;
   obtaining the navigation information from the caching component when the distributed navigation system is able to transmit the navigation information to the navigable physical object through the navigation guidance interface; and
   transmitting the navigation information to the navigable physical object through the navigation guidance interface.

42. The method of claim 37, wherein providing navigation information to a navigable physical object further comprises:
   generating predictive navigation information for the navigable physical object according to a prediction criterion;
   storing the predictive navigation information with a caching component of the distributed navigation system;
   retrieving the predictive navigation information from the caching component when the predictive navigation information corresponds to the physical location of the navigable physical object; and
   transmitting the predictive navigation information to the navigable physical object through the navigation guidance interface.

43. The method of claim 42, wherein the prediction criterion comprises a predicted physical location according to a speed and a heading for the navigable physical object.

44. The method of claim 42, wherein the prediction criterion comprises a predicted physical location according to a navigation route for the navigable physical object.

45. The method of claim 11, wherein the prediction criterion comprises a predicted physical location according to a navigation route for the navigable physical object.

46. The method of claim 42 further comprising generating the predictive navigation information for the navigable physical object according to previously generated navigation information.

47. The method of claim 37 further comprises providing navigation information for a plurality of navigable physical objects.

48. The method of claim 47, wherein providing navigation information for a plurality of navigable physical objects comprises generating navigation information for a plurality of navigable physical objects such that navigation information generated for a first navigable physical object is used to generate navigation information for a second navigable physical object.

49. A computer-readable medium having computer-readable instructions which, when executed on a plurality of computers in a computer network, carry out the method comprising:
   (a) receiving, at a first component of the distributed navigation system, a route definition pertaining to a navigable physical object;
   (b) constructing, at a second component of the distributed navigation system, a navigation route for the navigable physical object according to the route definition and routing information from a third component of the distributed navigation system; and
   (c) sensing, at a third component of the distributed navigation system, the physical location of the navigable physical object;
   (d) generating, at a fourth component of the distributed navigation system, navigation information for the navigable physical object according to the physical location of the navigable physical object, the routing information, and the navigation route; and
   (e) transmitting the navigation information to the navigable physical object via the first component;
   wherein the components of the distributed navigation system are distributed on a plurality of computers in the computer network external to the navigable physical object, and communicate among each other using a computer network protocol.

50. A computer-readable medium having computer-readable instructions which, when executed on a plurality of computers in a computer network, carry out the method comprising:
   (a) receiving a route definition pertaining to the navigable physical object by a navigation guidance interface component of the distributed navigation system and transmitting the route definition to a navigation management component of the distributed navigation system;
   (b) constructing, using the navigation management component, a navigation route for the navigable physical object according to the route definition and routing information, wherein the routing information is obtained from a navigation services component of the distributed navigation system, the routing information comprising:
      (i) mapping and geocoding guidance information obtained from a mapping and geocoding services component of the distributed navigation system; and
      (ii) point-of-interest guidance information obtained from a point-of-interest component of the distributed navigation system;
   (c) sensing the physical location of the navigable physical object with a physical location sensor component of the distributed navigation system;
   (d) generating navigation information for the navigable physical object, using a guidance component, according to the physical location of the navigable physical object, the routing information, and the navigation route; and
   (e) transmitting the navigation information to the navigable physical object through the navigation guidance interface;
   wherein the components are distributed on the plurality of computers in the computer network, external to the navigable physical object, and communicate among each other using a computer network protocol.

51. The method of claim 11 further comprising generating the predictive navigation information for the navigable physical object according to previously generated navigation information.

* * * * *

UNITED STATES PATENT AND TRADEMARK OFFICE
CERTIFICATE OF CORRECTION

PATENT NO. : 7,149,625 B2  Page 1 of 1
APPLICATION NO. : 10/158223
DATED : December 12, 2006
INVENTOR(S) : M.B. Mathews et al.

It is certified that error appears in the above-identified patent and that said Letters Patent is hereby corrected as shown below:

| COLUMN | LINE | ERROR |
|---|---|---|
| 20 | 41 | "or software" should read |
| (Claim 1, | line 20) | --are software -- |

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 7,149,625 B2 | |
| APPLICATION NO. | : 10/158223 | |
| DATED | : December 12, 2006 | |
| INVENTOR(S) | : M.B. Mathews et al. | |

It is certified that error appears in the above-identified patent and that said Letters Patent is hereby corrected as shown below:

COLUMN   LINE   ERROR

20           41         "or software" should read --are software --
(Claim 1,    line 20)

Signed and Sealed this

Twenty-second Day of May, 2007

JON W. DUDAS
*Director of the United States Patent and Trademark Office*

(12) INTER PARTES REEXAMINATION CERTIFICATE (793rd)
United States Patent
Mathews et al.

(10) Number: US 7,149,625 C1
(45) Certificate Issued: Jan. 13, 2014

(54) METHOD AND SYSTEM FOR DISTRIBUTED NAVIGATION AND AUTOMATED GUIDANCE

(75) Inventors: Michael B. Mathews, Kirkland, WA (US); Poul T. Lomholt, Hillsboro, OR (US); William A. Littlewood, Arlington, MA (US)

(73) Assignee: WRE-HOL LLC, Kirkland, WA (US)

Reexamination Request:
No. 95/001,349, Apr. 27, 2010

Reexamination Certificate for:
Patent No.: 7,149,625
Issued: Dec. 12, 2006
Appl. No.: 10/158,223
Filed: May 29, 2002

Certificate of Correction issued May 15, 2007
Certificate of Correction issued May 22, 2007

Related U.S. Application Data

(60) Provisional application No. 60/295,084, filed on May 31, 2001.

(51) Int. Cl.
*G01C 21/30* (2006.01)
*G01C 21/32* (2006.01)

(52) U.S. Cl.
USPC ............ 701/420; 701/410; 701/425; 701/428

(58) Field of Classification Search
USPC ........................................................ 701/209
See application file for complete search history.

(56) References Cited

To view the complete listing of prior art documents cited during the proceeding for Reexamination Control Number 95/001,349, please refer to the USPTO's public Patent Application Information Retrieval (PAIR) system under the Display References tab.

*Primary Examiner* — Matthew Heneghan

(57) ABSTRACT

The present invention provides for distributed navigation and route guidance using networked computing devices. A computing device may host one or more navigation functional components. The location of a navigable object is sensed and communicated to associated navigation components in a communication network. The navigation components collectively provide guidance information to a navigable object controller. A navigable object controller directs the movement of an navigable object using guidance information to keep it on a specified route. The navigable object controller interacts with the distributed navigation system through an interface, which provides the appropriate presentation of guidance information and functions for the particular type of navigable object controller (e.g., human-machine interface, or system to system). The present invention provides the structures and methods for a flexible navigation and guidance system supporting a variety of network capabilities and computing devices using the same software implementation.

At the time of issuance and publication of this certificate, the patent remains subject to pending reexamination control number 90/012,198 filed Mar. 15, 2012. The claim content of the patent may be subsequently revised if a reexamination certificate issues from the reexamination proceeding.

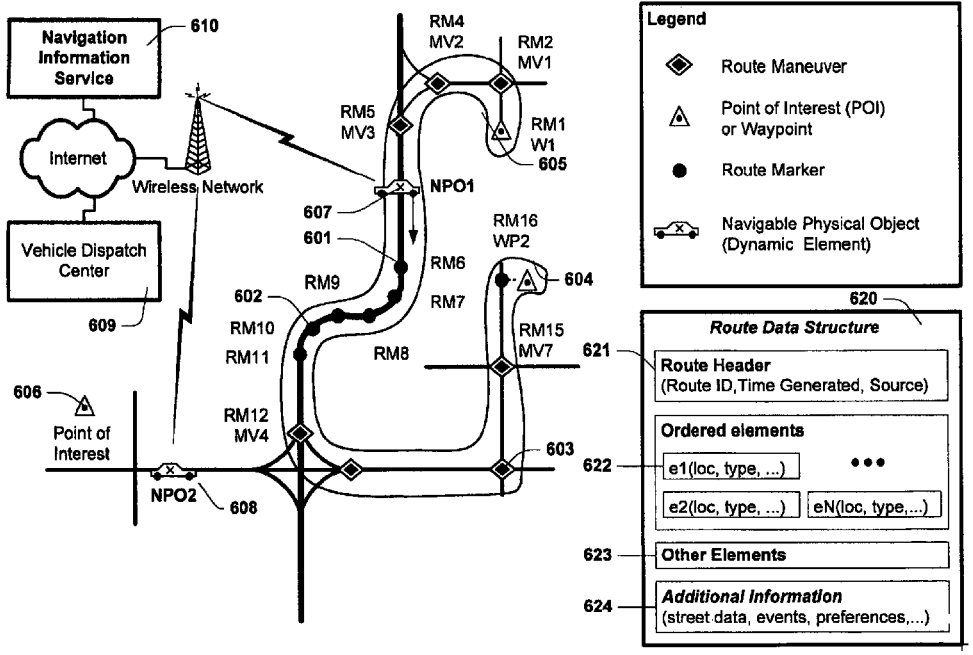

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-51 are cancelled.

\* \* \* \* \*